US012799811B2

(12) United States Patent
Strand

(10) Patent No.: US 12,799,811 B2
(45) Date of Patent: Nov. 17, 2026

(54) HYBRID COVERING FOR AN ARCHITECTURAL STRUCTURE

(71) Applicant: Hunter Douglas Inc., New York, NY (US)

(72) Inventor: Toralf H. Strand, San Diego, CA (US)

(73) Assignee: Hunter Douglas Inc., New York, NY (US)

( * ) Notice: Subject to any disclaimer, the term of this patent is extended or adjusted under 35 U.S.C. 154(b) by 458 days.

(21) Appl. No.: 17/911,780

(22) PCT Filed: Mar. 17, 2021

(86) PCT No.: PCT/US2021/022719
§ 371 (c)(1),
(2) Date: Sep. 15, 2022

(87) PCT Pub. No.: WO2021/188641
PCT Pub. Date: Sep. 23, 2021

(65) Prior Publication Data

US 2023/0193688 A1 Jun. 22, 2023

Related U.S. Application Data

(60) Provisional application No. 62/991,253, filed on Mar. 18, 2020.

(51) Int. Cl.
*E06B 9/264* (2006.01)
*E06B 9/24* (2006.01)
(Continued)

(52) U.S. Cl.
CPC .............. *E06B 9/264* (2013.01); *E06B 9/262* (2013.01); *E06B 9/42* (2013.01);
(Continued)

(58) Field of Classification Search
CPC .. E06B 9/264; E06B 9/262; E06B 2009/2441; E06B 2009/2627; E06B 9/32;
(Continued)

(56) References Cited

U.S. PATENT DOCUMENTS

| | | | | |
|---|---|---|---|---|
| 1,548,523 A * | 8/1925 | Friend | E06B 9/262 160/231.1 |
| 1,987,657 A * | 1/1935 | Arms | E06B 9/264 160/176.1 R |

(Continued)

FOREIGN PATENT DOCUMENTS

| | | |
|---|---|---|
| CN | 207999205 U † | 10/2018 |
| EP | 1022428 A1 † | 7/2000 |

(Continued)

OTHER PUBLICATIONS

PCT International Search Report and Written Opinion for corresponding PCT Application No. PCT/US2021/022719, mailed on Jun. 22, 2021 (12 pages).

*Primary Examiner* — Daniel P Cahn
*Assistant Examiner* — John W Hanes, Jr.
(74) *Attorney, Agent, or Firm* — Dority & Manning, P.A.

(57) ABSTRACT

In one aspect, a covering for an architectural structure includes an upper rail, a bottom rail configured to be spaced apart from the upper rail, and an intermediate rail positioned between the upper rail and the bottom rail. The covering also includes a first shade panel supported between the upper rail and the intermediate rail that has a first shade configuration, and a second shade panel supported between the intermediate rail and the bottom rail that has a second shade configuration, with the second shade configuration differing from the first shade configuration.

20 Claims, 17 Drawing Sheets

(51) Int. Cl.
*E06B 9/262* (2006.01)
*E06B 9/42* (2006.01)
*E06B 9/72* (2006.01)

(52) U.S. Cl.
CPC ................. *E06B 2009/2441* (2013.01); *E06B 2009/2627* (2013.01); *E06B 9/72* (2013.01)

(58) Field of Classification Search
CPC ............. E06B 9/322; E06B 2009/3222; E06B 2009/2423; E06B 2009/2429
See application file for complete search history.

(56) References Cited

U.S. PATENT DOCUMENTS

| | | | | |
|---|---|---|---|---|
| 2,566,640 | A * | 9/1951 | Smith | E06B 9/264<br>454/224 |
| 2,646,114 | A † | 7/1953 | Kearny | |
| 4,753,281 | A * | 6/1988 | Wagner | E06B 9/262<br>160/279 |
| 4,813,468 | A * | 3/1989 | Fraser | E06B 9/32<br>160/84.03 |
| 4,825,929 | A * | 5/1989 | Haines | E06B 9/327<br>160/279 |
| 4,842,034 | A * | 6/1989 | Haines | B60J 1/2091<br>160/87 |
| 5,121,783 | A * | 6/1992 | Nilsson | E06B 9/262<br>160/84.03 |
| 5,249,616 | A * | 10/1993 | Yen | E06B 9/264<br>160/310 |
| 5,351,737 | A * | 10/1994 | Hoshiyama | E06B 9/262<br>160/84.03 |
| 6,006,812 | A * | 12/1999 | Corey | E06B 9/262<br>160/176.1 R |
| 6,196,292 | B1 * | 3/2001 | Jackson | E06B 9/303<br>160/113 |
| 6,227,279 | B1 * | 5/2001 | Belongia | E06B 9/303<br>160/176.1 R |
| 6,305,454 | B1 * | 10/2001 | Judkins | E06B 9/322<br>160/113 |
| 6,516,856 | B2 * | 2/2003 | Lai | E06B 9/262<br>160/167 R |
| 6,536,503 | B1 * | 3/2003 | Anderson | E06B 9/322<br>242/375.3 |
| 6,571,851 | B1 * | 6/2003 | Jelic | E06B 9/262<br>160/90 |
| 6,814,128 | B2 * | 11/2004 | Nien | E06B 9/32<br>160/84.06 |
| 6,854,502 | B2 * | 2/2005 | Lai | E06B 9/262<br>160/84.03 |
| 7,063,122 | B2 * | 6/2006 | Colson | E06B 9/34<br>160/245 |
| 7,264,033 | B2 * | 9/2007 | Lai | E06B 9/26<br>160/172 R |
| 7,624,784 | B2 * | 12/2009 | Anthony | E06B 9/40<br>160/84.01 |
| 7,806,159 | B2 * | 10/2010 | Rossato | E06B 9/262<br>160/84.01 |
| 8,365,797 | B2 * | 2/2013 | Drew | E06B 9/262<br>160/84.05 |
| 8,573,281 | B2 * | 11/2013 | Drew | E06B 9/262<br>160/84.05 |
| D701,060 | S * | 3/2014 | Strand | D6/575 |
| 8,720,523 | B2 * | 5/2014 | Nakamura | E06B 9/322<br>160/167 R |
| 8,726,969 | B2 * | 5/2014 | Lin | E06B 9/40<br>160/89 |
| 8,830,058 | B2 * | 9/2014 | Yeh | A47H 5/0325<br>160/310 |
| 9,260,913 | B2 * | 2/2016 | Birkestrand | E06B 9/262 |
| 9,322,211 | B2 * | 4/2016 | Birkestrand | E06B 9/262 |
| 9,422,766 | B2 * | 8/2016 | Anderson | E06B 9/326 |
| 9,435,154 | B2 * | 9/2016 | Chen | E06B 9/322 |
| 9,708,850 | B2 * | 7/2017 | Anderson | E06B 9/325 |
| 9,732,554 | B2 * | 8/2017 | Teuscher | E06B 9/362 |
| 9,739,087 | B2 * | 8/2017 | Teuscher | E06B 9/388 |
| 9,797,188 | B2 † | 10/2017 | Rettig | |
| 10,030,437 | B2 * | 7/2018 | Teuscher | E06B 9/262 |
| 10,138,676 | B2 * | 11/2018 | Bohlen | E06B 9/90 |
| 10,731,410 | B2 * | 8/2020 | Teuscher | E06B 9/367 |
| 11,306,533 | B2 * | 4/2022 | Teuscher | E06B 9/262 |
| 11,448,009 | B2 * | 9/2022 | Otsuka | E06B 9/262 |
| 2004/0016514 | A1 * | 1/2004 | Nien | E06B 9/32<br>160/115 |
| 2004/0250963 | A1 * | 12/2004 | Hsu | E06B 9/327<br>160/84.03 |
| 2005/0006035 | A1 * | 1/2005 | Lai | E06B 9/303<br>160/89 |
| 2005/0051281 | A1 * | 3/2005 | Lai | E06B 9/322<br>160/167 R |
| 2006/0108074 | A1 * | 5/2006 | Morin | E06B 9/52<br>160/102 |
| 2006/0289122 | A1 * | 12/2006 | Lin | E06B 9/30<br>160/115 |
| 2008/0093033 | A1 * | 4/2008 | Hsu | E06B 9/322<br>160/169 |
| 2008/0128097 | A1 * | 6/2008 | Yu | E06B 9/322<br>160/368.1 |
| 2008/0148638 | A1 * | 6/2008 | Knowles | B64C 1/1484<br>49/70 |
| 2008/0149279 | A1 * | 6/2008 | Leighty | E06B 9/262<br>160/10 |
| 2009/0014133 | A1 * | 1/2009 | Lin | E06B 9/262<br>160/181 |
| 2009/0101288 | A1 * | 4/2009 | Yu | E06B 9/262<br>160/84.05 |
| 2010/0206492 | A1 * | 8/2010 | Shevick | E06B 9/30<br>160/170 |
| 2011/0005690 | A1 * | 1/2011 | Harding | E06B 9/262<br>160/84.03 |
| 2012/0200247 | A1 * | 8/2012 | Baugh | E06B 9/322<br>318/468 |
| 2013/0087296 | A1 * | 4/2013 | Mullet | E06B 9/262<br>160/405 |
| 2014/0158314 | A1 * | 6/2014 | Anderson | E06B 9/322<br>16/93 D |
| 2014/0166216 | A1 * | 6/2014 | Hsu | E06B 9/262<br>160/84.03 |
| 2015/0075729 | A1 * | 3/2015 | Anderson | E06B 9/322<br>160/193 |
| 2015/0144275 | A1 * | 5/2015 | Ganzi | E06B 9/32<br>160/84.03 |
| 2015/0259977 | A1 * | 9/2015 | Anderson | E06B 9/322<br>160/168.1 R |
| 2016/0186490 | A1 * | 6/2016 | Teuscher | E06B 9/36<br>160/181 |
| 2016/0222721 | A1 * | 8/2016 | Rettig | E06B 9/262 |
| 2016/0222723 | A1 * | 8/2016 | Morris | E06B 9/322 |
| 2017/0081912 | A1 * | 3/2017 | Guillory | E06B 9/305 |
| 2017/0096853 | A1 * | 4/2017 | Eubanks, Sr. | H02S 40/38 |
| 2018/0080279 | A1 * | 3/2018 | Eubanks, Sr. | E06B 9/38 |
| 2018/0171702 | A1 * | 6/2018 | Hall | E06B 3/6722 |
| 2018/0179812 | A1 * | 6/2018 | Dubina | E06B 9/308 |
| 2018/0291681 | A1 * | 10/2018 | Kanno | E06B 9/32 |
| 2019/0032402 | A1 * | 1/2019 | Ter Haar | E06B 9/322 |
| 2019/0041017 | A1 * | 2/2019 | Yui | F21S 19/005 |
| 2019/0249433 | A1 * | 8/2019 | Guest | E06B 9/58 |
| 2020/0141183 | A1 * | 5/2020 | Jang | E06B 9/50 |
| 2020/0370368 | A1 * | 11/2020 | Huang | E06B 9/324 |

FOREIGN PATENT DOCUMENTS

| | | | |
|---|---|---|---|
| GB | 2479976 | A † | 11/2011 |
| WO | WO2009/065404 | A1 | 5/2009 |

* cited by examiner
† cited by third party

HYBRID COVERING FOR AN ARCHITECTURAL STRUCTURE

CROSS-REFERENCE TO RELATED APPLICATIONS

The present application is a National Phase Application of International Patent Application No. PCT/US2021/022719, filed Mar. 17, 2021, which, in turn, is based upon and claims the right of priority to U.S. Provisional Patent Application No. 62/991,253, filed Mar. 18, 2020, the disclosures of both of which are hereby incorporated by reference herein in their entirety for all purposes.

FIELD

The present subject matter relates generally to coverings for architectural structures and related systems and, more particularly, to a hybrid covering including first and second panel sections with differing shade configurations.

BACKGROUND

To provide a typical top-down bottom-up (TDBU) arrangement, a window covering includes a headrail, a movable bottom rail, and a movable intermediate rail supported between the headrail and the bottom rail. Additionally, a shade panel is supported between the intermediate and bottom rails and serves as the primary shade/light-affecting element of the covering. With such an arrangement, the covering can be operated from the top-down by maintaining the intermediate rail adjacent to the headrail and by moving the bottom rail downward relative to the intermediate rail to expose or extend the shade panel therebetween. Similarly, the covering can be operated from the bottom-up by positioning the bottom rail and the intermediate rail at the bottom of the window frame and by moving the intermediate rail upward relative to the bottom rail to expose or extend the shade panel therebetween. With such bottom-up operation, an open space or gap is typically defined between the headrail and the intermediate rail that is uncovered or exposed, thereby providing a view through the covering and the adjacent window.

Additionally, with a TDBU arrangement, the intermediate rail is typically suspended from the headrail by two or more lift cords extending vertically between the headrail and the intermediate rail. In this regard, when the covering is being operating from the bottom-up, the lift cords extend vertically across the open space or gap defined between the headrail and the intermediate rail. Such visibility of the lift cords is often considered an undesirable aesthetic by consumers. Moreover, the lift cords extending across such open space or gap are directly accessible and manipulatable by users of the covering. In today's market, it is typically desirable to remove any of such accessible cords and/or otherwise provide cordless configurations for a covering. However, even when a cordless option is available, such cordless configurations often suffer from various drawbacks, including limited drop lengths.

Accordingly, a hybrid covering that provides an improved TDBU arrangement and/or that otherwise addresses one or more issues associated with prior art coverings would be welcomed in the technology.

BRIEF SUMMARY

Aspects and advantages of the present subject matter will be set forth in part in the following description, or may be obvious from the description, or may be learned through practice of the present subject matter.

In one aspect, the present subject matter is directed to a covering for an architectural structure including an upper rail, a bottom rail configured to be spaced apart from the upper rail, and an intermediate rail positioned between the upper rail and the bottom rail. The covering also includes a first shade panel supported between the upper rail and the intermediate rail that has a first shade configuration, and a second shade panel supported between the intermediate rail and the bottom rail that has a second shade configuration, with the second shade configuration differing from the first shade configuration. Moreover, the covering includes a first operating system provided in operative association with the upper rail and configured to allow the first shade panel to be extended and retracted as a spacing between the upper rail and the intermediate rail is increased and decreased, respectively, with the first operating system requiring a first minimum operating force to be applied thereto to extend the first shade panel. Further, the covering includes a second operating system provided in operative association with one of the intermediate rail or the bottom rail and configured to allow the second shade panel to be extended and retracted as a spacing between the intermediate rail and the bottom rail is increased and decreased, respectively, with the second operating system requiring a second minimum operating force to be applied thereto to extend the second shade panel that is less than the first minimum operating force.

In another aspect, the present subject matter is directed to a covering for an architectural structure including an upper rail, a bottom rail configured to be spaced apart from the upper rail, and an intermediate rail positioned between the upper rail and the bottom rail. The covering also includes a first shade panel supported between the upper rail and the intermediate rail that has a first shade configuration, and a second shade panel supported between the intermediate rail and the bottom rail that has a second shade configuration, with the second shade configuration differing from the first shade configuration. Moreover, the covering includes a first operating system provided in operative association with the upper rail and configured to allow the first shade panel to be extended and retracted, and a second operating system provided in operative association with one of the intermediate rail or the bottom rail and configured to allow the second shade panel to be extended and retracted. Further, the intermediate rail is suspended without cords relative to the headrail via the first shade panel.

In a further aspect, the present subject matter is directed to a covering for an architectural structure including a roller, a bottom rail configured to be spaced apart from the roller, and an intermediate rail positioned between the roller and the bottom rail. The covering also includes a roller shade panel supported between the roller and the intermediate rail, and a non-roller shade panel supported between the intermediate rail and the bottom rail. Moreover, the covering includes a first operating system provided in operative association with the roller and configured to allow the roller shade panel to be unwound from and wound around the roller as the intermediate rail is respectively moved away from and towards the roller, and a second operating system provided in operative association with the bottom rail and configured to allow the non-roller shade panel to be extended and retracted as a spacing between the intermediate rail and the bottom rail is increased and decreased, respectively.

These and other features, aspects, and advantages of the present subject matter will become better understood with reference to the following Detailed Description and appended claims. The accompanying drawings, which are incorporated in and constitute a part of this specification, illustrate embodiments of the present subject matter and, together with the description, serve to explain the principles of the present subject matter.

This Brief Description is provided to introduce a selection of concepts in a simplified form that are further described below in the Detailed Description. This Brief Description is not intended to identify key features or essential features of the claimed subject matter, nor is it intended as an aid in determining the scope of the claimed subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
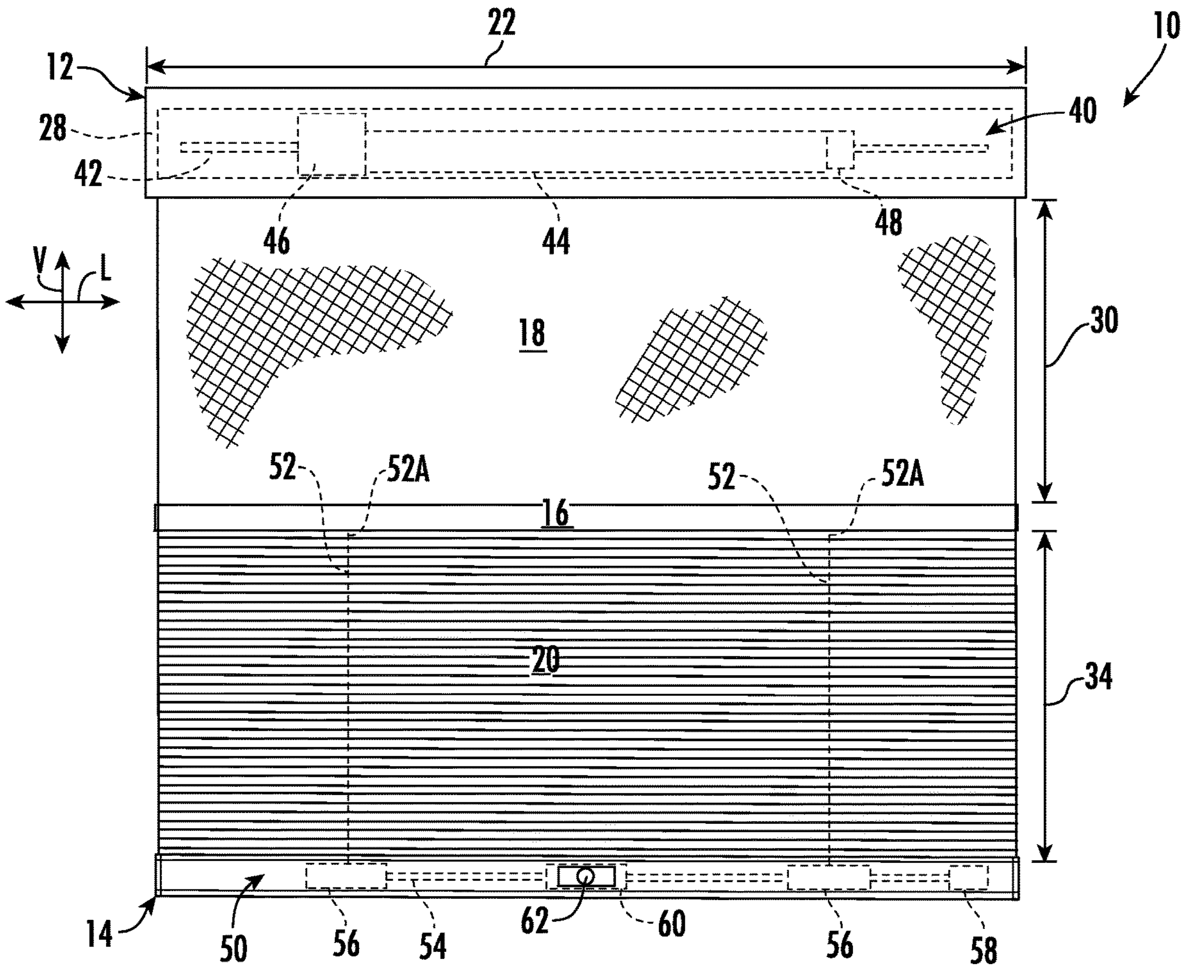
FIG. 1 illustrates a front view of one embodiment of a hybrid covering for an architectural structure in accordance with aspects of the present subject matter, particularly illustrating first and second shade panels of the covering at partially extended positions.

In general, the present subject matter is directed to a hybrid covering for an architectural feature or structure (referred to herein simply as an architectural "structure" for the sake of convenience and without intent to limit). In several embodiments, the covering includes an upper rail, a bottom rail configured to spaced apart from the upper rail, and an intermediate rail positioned between the upper and bottom rails. Additionally, the covering includes a first shade panel configured to be supported between the upper rail and the intermediate rail to allow the first shade panel to be extended and retracted, as desired, relative to the upper rail. The covering also includes a second shade panel configured to be supported between the intermediate rail and the bottom rail to allow the second shade panel to be extended and retracted, as desired, between such rails.

In several embodiments, the shade panels may be selected such that the first shade panel has a different shade configuration than the second shade panel, such as by configuring the first shade panel as a different shade panel type than the second shade panel and/or by forming the first shade panel from a material having different light transmissivity characteristics than the material used to form the second shade panel. For instance, in one embodiment, the first shade panel may be configured as a roller shade panel, while the second shade panel may be configured as a different shade panel type, such as a cellular shade panel, a pleated shade panel, and/or any other suitable non-roller shade panel type. Similarly, in one embodiment, one of the shade panels may be formed from a transparent or semi-transparent material, such a clear film or sheer material, while the other shade panel may be formed from an opaque material, such as a light-filtering material or a black-our or room-darkening material ("black-out" and "room-darkening" materials being simply referred to herein as "room-darkening" materials for the sake of convenience and without intent to limit).

Additionally, in several embodiments, the disclosed covering may provide a cordless top-down bottom-up (TDBU) arrangement. For example, by configuring the first shade panel as a roller shade panel, the intermediate rail and the various components supported below the intermediate rail (e.g., the second shade panel and the bottom rail) may be supported directly by the roller shade panel without requiring that any cords be coupled between the headrail and the intermediate rail to support the weight of such suspended components. Moreover, in such an embodiment, the roller shade panel may be formed from a transparent or semi-transparent material, while the lower, second shade panel may be formed from an opaque material. As a result, a user may select the extent to which each shade panel is extended to provide the desired shading characteristics for the covering, such as by extending the roller shade panel across all or a portion of the adjacent architectural structure to allow a substantial amount of light to pass therethrough and/or to provide view through the covering or by extending the opaque, second shade panel across all or a portion of the adjacent architectural structure to provide more privacy and/or to prevent a larger portion (or all) of the light from passing therethrough.

Moreover, in several embodiments, the disclosed covering may include an operating system associated with each respective shade panel for facilitating extension and retraction of the shade panel relative to the adjacent architectural structure. For instance, a first operating system may be provided (e.g., in operative association with the upper rail) to allow the first shade panel to be extended and retracted. Similarly, a second operating system may be provided (e.g., in operative association with the intermediate rail or the bottom rail) to allow the second shade panel to be extended and retracted. In one embodiment, the first and second operating systems may be manually operated or motorized.

In accordance with aspects of the present subject matter, each of the first and second operating systems may correspond to an unbalanced operating system or a balanced operating system. For instance, in several embodiments, both operating systems may be configured as unbalanced operating systems or as balanced operating systems. Alternatively, one of the operating systems may be configured as an unbalanced operating system, while the other operating system is configured as a balanced operating system. For example, in one embodiment, the second operating system may be configured as a balanced operating system, while the first operating system is configured as an unbalanced operating system.

Moreover, in several embodiments, the operating force required to extend the first and second shade panels via their respective operating systems may differ. For instance, the first operating system may require a first minimum operating force to be applied thereto to extend the first shade panel, and the second operating system may require a second minimum operating force to be applied thereto to extend the second shade panel. In one embodiment, the first operating system and/or the second operating system is designed such that first minimum operating force is greater the second minimum operating force. As a result, the second shade panel may be extended without extending the first shade panel (e.g., by applying a downforce force on the bottom rail that is less than the first minimum operating force).

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

Referring now to drawings, FIGS. 1-5 illustrate different views of one embodiment of a hybrid covering 10 for an architectural structure in accordance with aspects of the present subject matter. Specifically, FIG. 1 illustrates a front view of the covering 10, particularly illustrating first and second shade panels of the covering 10 at partially extended positions. Additionally, FIGS. 2-5 illustrate perspective views of the covering 10 shown in FIG. 1 with the shade panels of the covering 10 in various different states of extension/retraction.

In general, the covering 10 may be configured to be installed relative to a window, door, or any other suitable architectural structure (not shown) as may be desired. In one embodiment, the covering 10 may be configured to be mounted relative to an architectural structure to allow the covering 10 to be suspended or supported relative to the architectural structure. It should be understood that the covering 10 is not limited in its particular use as a window or door shade, and may be used in any application as a covering, partition, shade, and/or the like, relative to and/or within any type of architectural structure.

As shown in the illustrated embodiment, the covering 10 includes an upper rail (e.g., in the form of a headrail 12), a bottom rail 14 spaced apart from the headrail 12, and an intermediate rail 16 positioned between the headrail 12 and the bottom rail 14. Additionally, the covering 10 includes a first shade panel 18 supported between the headrail 12 and the intermediate rail 16, and a second shade panel 20 supported between the intermediate rail 16 and the bottom rail 14. As shown in FIGS. 1-5, each rail 12, 14, 16 generally extends in a longitudinal or lateral direction of the covering 10 (as indicated by arrow L in FIGS. 1-5) across a lateral width 22 (FIG. 1) of the covering 10. Additionally, each shade panel 18, 20 is generally configured to extend in the lateral direction L across the lateral width 22 of the covering 10 and in a vertical direction of the covering 10 (as indicated by arrow V in FIGS. 1-5) between its respective adjacent pair of rails 12, 14, 16, with the vertical extent of each shade panel 18, 20 differing depending in its degree of extension relative to its fully retracted position. Additionally, the covering 10 may also define a front side 24 (FIG. 2) and a rear side 26 (FIG. 2) spaced apart from each other along a crosswise direction of the covering 10 (as indicated by arrow CW in FIGS. 2-5)

In several embodiments, the first and second shade panels 18, 20 may have different shade configurations. When used in association with a shade panel, the term "shade configuration" may refer, for example, to the shade panel type associated with the shade panel 18, 20 (e.g., a flat/roller shade panel, a pleated shade panel, a cellular shade panel, etc.) and/or the light transmissivity characteristics (or lack thereof) of the material forming the shade panel 18, 20 (e.g., a transparent shade panel formed from a transparent material, such a clear film; a semi-transparent shade panel formed from a semi-transparent material, such as sheer material; or an opaque shade panel formed from a light-filtering material or a room-darkening material). Thus, the first shade panel 18 may have a different shade configuration than the second shade panel 20 by configuring the first shade panel 18 as a different shade type than the second shade panel 20 and/or by forming the first shade panel 18 from a material having a light transmissivity that differs from the material used to form the second shade panel 20. For instance, in one embodiment, the first and second shade panels 18, 20 may correspond to the same shade type (e.g., by configuring both shade panels 18, 20 as roller shade panels or cellular shade panels), but may exhibit differing light transmissivity characteristics (e.g., by configuring the first shade panel 18 as a semi-transparent shade panel formed from a sheer material and by configuring the second shade panel 20 as an opaque shade panel formed from a light-filtering or room-darkening material). As another example, the first and second shade panels 18, 20 may correspond to different shade types (e.g., by configuring the first shade panel 18 as a roller shade panel and the second shade panel 20 as a cellular shade panel), and may also exhibit differing light transmissivity characteristics (e.g., by configuring the first shade panel 18 as a semi-transparent or sheer shade panel and the second shade panel 29 as an opaque shade panel).

Figure 2:
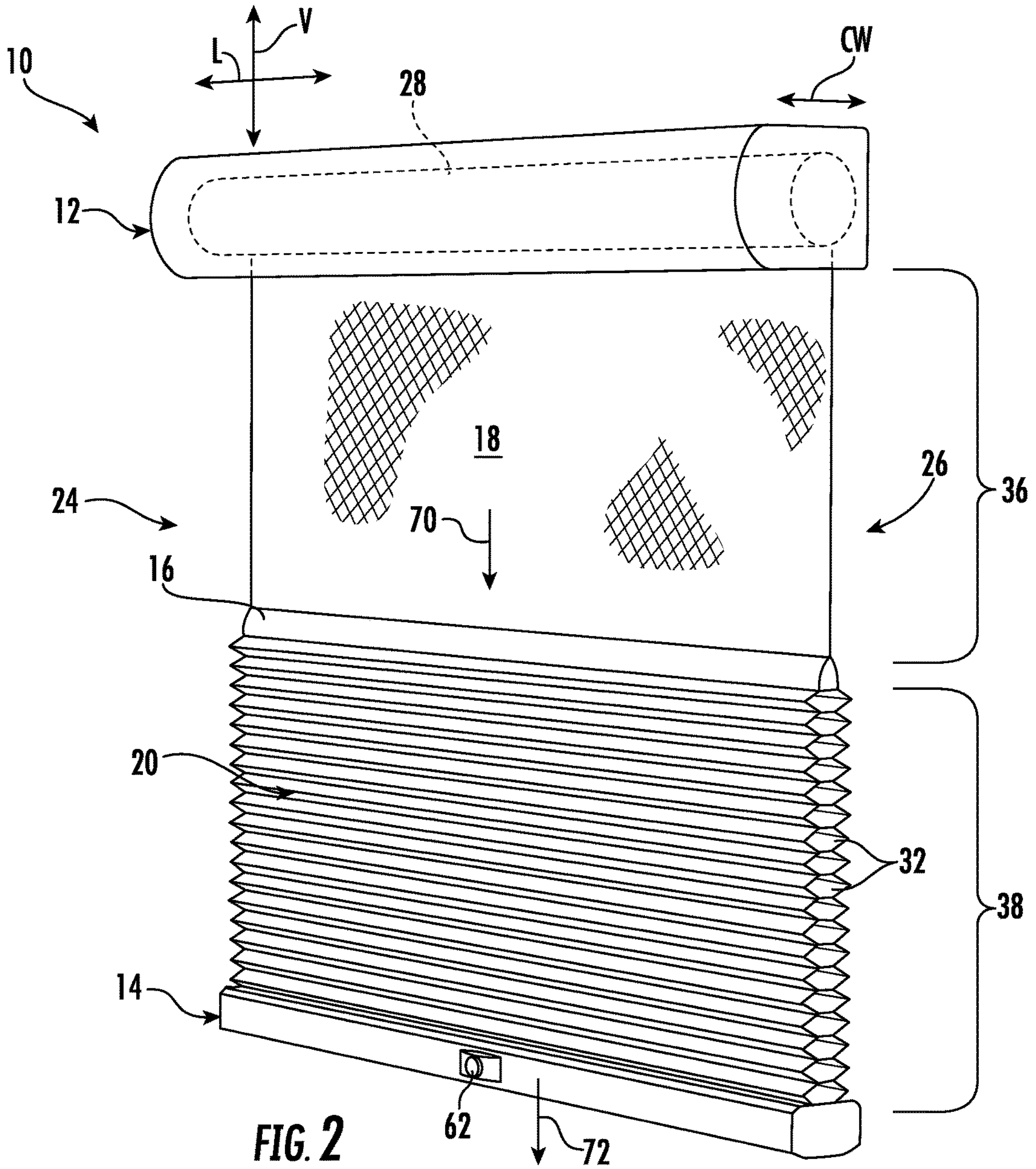
FIG. 2 illustrates a perspective view of the covering shown in FIG. 1.
Figure 3:
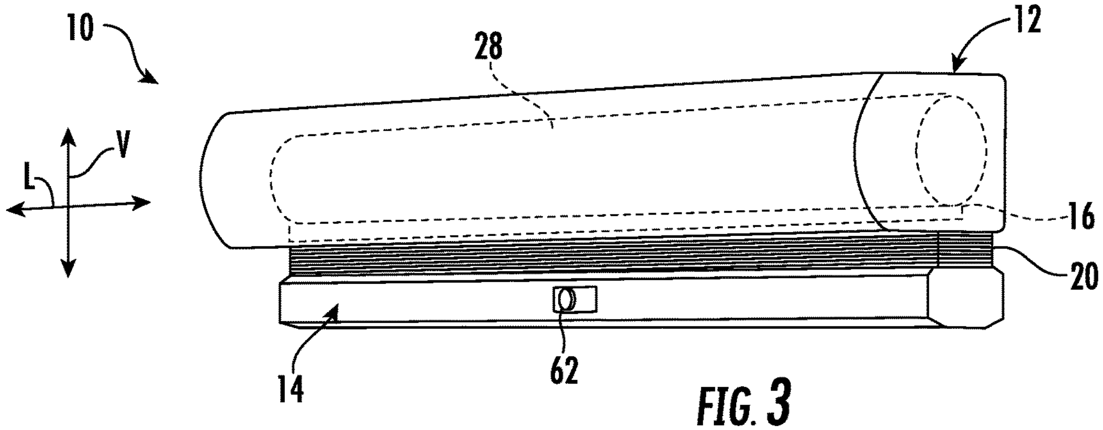
FIG. 3 illustrates another perspective view of the covering shown in FIG. 1, particularly illustrating the first and second shade panels of the covering at fully retracted positions.
Figure 4:
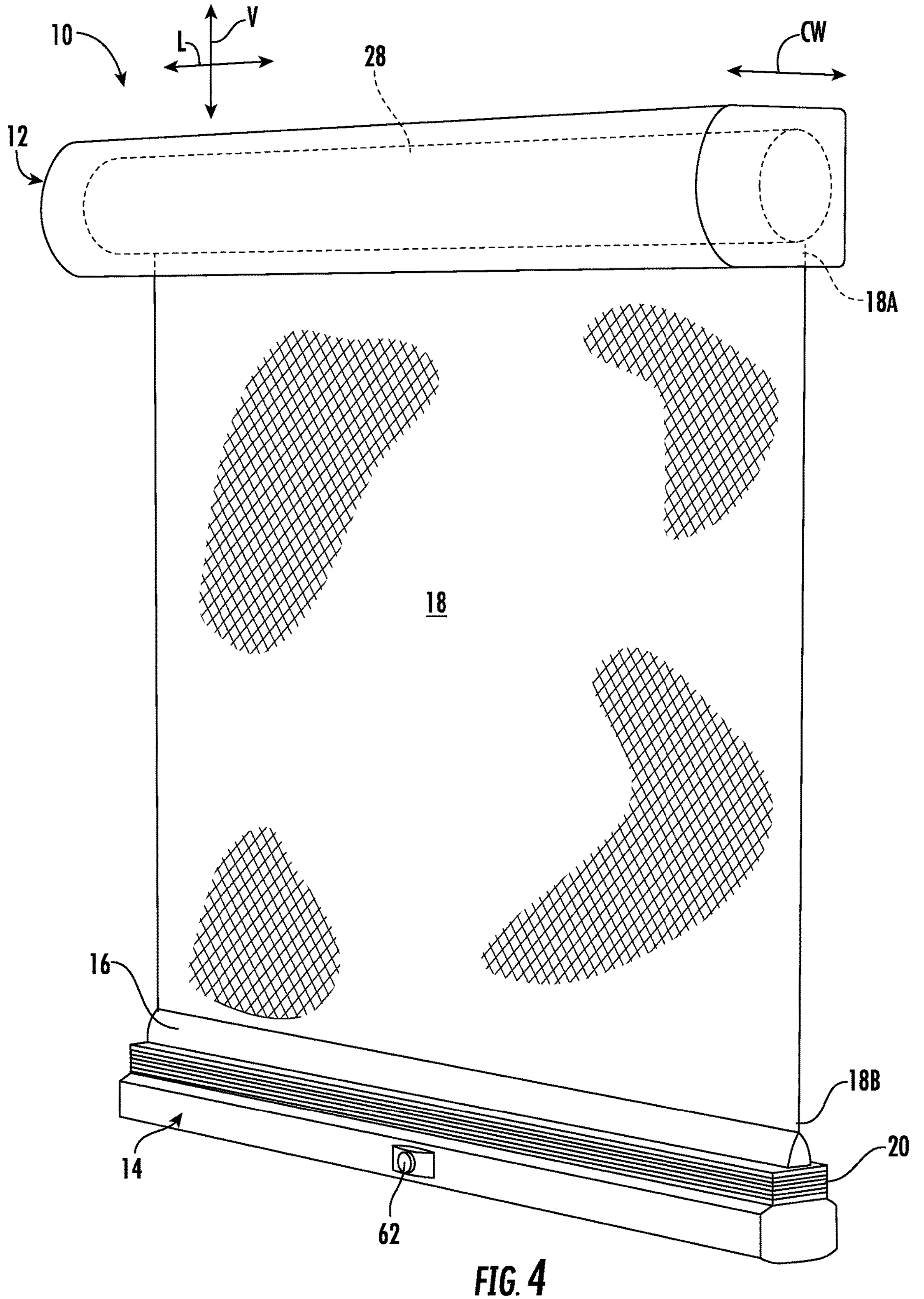
FIG. 4 illustrates a further perspective view of the covering shown in FIG. 1, particularly illustrating the first shade panel of the covering at a fully extended position and the second shade panel of the covering at a fully retracted position.
Figure 5:
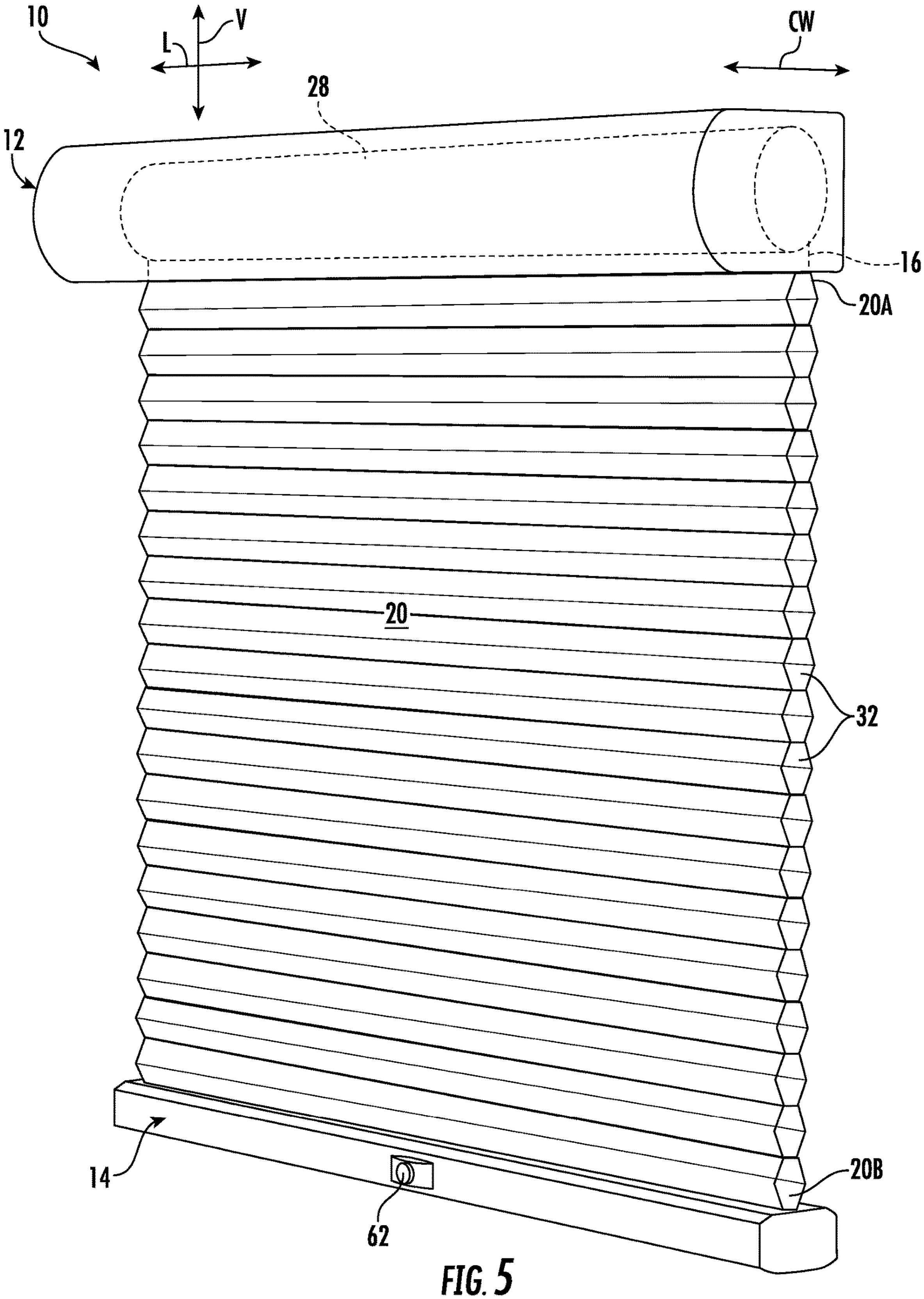
FIG. 5 illustrates yet another perspective view of the covering shown in FIG. 1, particularly illustrating the second shade panel of the covering at a fully extended position and the first shade panel of the covering at a fully retracted position.

As shown in the illustrated embodiment, the first shade panel 18 is configured as a roller shade panel. In such an embodiment, the first shade panel 18 may correspond to a flat or planar panel having an upper end 18A (FIG. 4) coupled to a corresponding roller 28 provided in operative association with the headrail 12 (e.g., by being supported within the headrail 12) and a lower end 18B (FIG. 4) coupled to the intermediate rail 16, with the first shade panel 18 configured to be unwound from and wound around the roller 28 to extend and retract the shade panel 18, respectively. For instance, FIGS. 3 and 5 illustrate the first shade panel 18 in a fully retracted position, at which the shade panel 18 is substantially completely wound around the associated roller 28 and the intermediate rail 16 is positioned generally adjacent to and/or recessed within the headrail 12, and FIGS. 2 and 4 illustrate the first shade panel 18 at different extended positions, at which the shade panel 18 has been unwound from the roller 28 to varying degrees or drop lengths to cover a given portion(s) of the adjacent architectural structure (which also adjusts a vertical spacing distance 30 (FIG. 1) defined between the headrail 12 (or roller 28) and the intermediate rail 16). It should be appreciated that, as shown in FIGS. 3 and 5, the intermediate rail 16 may, in one embodiment, be configured to be concealed within the headrail 12 when the first shade panel 18 is moved to the fully retracted position. It should also be appreciated that, in alternative embodiments, the roller 28 may be provided or used without the headrail 12, in which case the roller 28, itself, may form the upper rail of the covering 10, such as by configurating the roller 28 as a rotator rail.

Additionally, as shown the illustrated embodiment, the second shade panel 20 is configured as a different shade type than the first shade panel 18, namely a cellular shade panel. In such an embodiment, the second shade panel 20 may correspond to or be configured as a cellular blanket formed from a plurality of vertically aligned cells 32 extending between an upper end 20A (FIG. 5) of the shade panel 20 coupled to the intermediate rail 16 and an lower end 20B of the shade panel 20 coupled to the bottom rail 14, with the cellular blanket configured to be expanded and collapsed between the intermediate rail 16 and the bottom rail 14 to extend and retract the second shade panel 20, respectively. For instance, FIGS. 3 and 4 illustrate the second shade panel 20 in a fully retracted position, at which the cells 32 are fully collapsed and the bottom rail 14 is positioned at its closest position to the intermediate rail 16, and FIGS. 2 and 5 illustrate the second shade panel 20 at different extended positions, at which the cellular blanket has been extended to varying degrees to cover a given portion(s) of the adjacent architectural structure (which also adjusts a vertical spacing distance 34 (FIG. 1) defined between the intermediate rail 16 and the bottom rail 14).

By configuring the first shade panel 18 as a roller shade panel, the hybrid covering 10 may provide a cordless top-down bottom-up (TDBU) arrangement. Specifically, the first shade panel 18, itself, may vertically support the intermediate rail 16 and all the components suspended therefrom (e.g., the second shade panel 20 and the bottom rail 14). As a result, no cords are needed between the headrail 12 and the intermediate rail 16 to support the weight of the lower suspended components. Rather, with the lower end 18B of the first shade panel 18 coupled to the intermediate rail 16, such rail 16, along with the second shade panel 20 and the bottom rail 14, are suspended directly from the first shade panel 18.

It should be appreciated that, when a TDBU arrangement is desired, the first shade panel 18 may, for example, be formed from a transparent or semi-transparent material such that the shade panel 18 has a transparent or semi-transparent shade configuration, such as by forming the first shade panel 18 from a clear film material or a sheer material. Similarly, the second shade panel 20 may, for instance, be formed from an opaque material such that the shade panel 20 has an opaque shade configuration, such as by forming the second shade panel 20 from a light-filtering material or a room-darkening material. In such an embodiment, a user may select the extent to which each shade panel 18, 20 is extended to provide the desired shading characteristics for the covering 10. For instance, by fully retracting the second shade panel 20 and extending the first shade panel 18 across the entirety of the adjacent architectural structure (e.g., as shown in FIG. 4), the user may be provided with a transparent or semi-transparent covering that allows a substantial amount of light to pass therethrough and that also provides a see-through view. Similarly, by fully retracting the first shade panel 18 and extending the second shade panel 20 across the entirety of the adjacent architectural structure (e.g., as shown in FIG. 5), the covering 10 may provide the user with more privacy and may prevent a larger portion (or all) of the light from passing therethrough. Alternatively, to provide a hybrid configuration, the user may partially extend both shade panels 18, 20 (e.g., as shown in FIG. 2), such that an upper section or span 36 of the covering 10 across which the first shade panel 18 extends provides a transparent or semi-transparent shade configuration, while a lower section or span 38 of the covering 10 across which the second shade panel 20 extends provides an opaque shade configuration.

It should be appreciated that, in other embodiments, one or both of the shade panels 18, 20 may have a different shade configuration than that shown in FIGS. 1-5 and/or than that described above. For instance, in one embodiment, the second shade panel 20 may be configured as a different non-roller shade panel type than a cellular shade panel, such as a pleated shade panel. In another embodiment, both shade panels 18, 20 may be configured as roller shade panels, in which case a second roller may be provided in operative association with the intermediate rail 16 to allow the second shade panel 20 to be wound around and unwound therefrom. In such an embodiment, the upper roller shade panel (e.g., the first shade panel 18) may, for instance, be formed from a transparent or semi-transparent material, while the lower roller shade panel (e.g., the second shade panel 20) may be formed from an opaque material. In an even further embodiment, the second shade panel 20 may be configured as a roller shade panel, while the first shade panel 18 may be configured as a non-roller shade panel type (e.g., a cellular shade panel).

It should also be appreciated that, although the intermediate rail 16 is shown in the illustrated embodiment as being configured as a conventional rail member, the intermediate rail 16 may generally correspond to any suitable component, structure, and/or joint provided or defined between the first and second shade panels 18, 20. For instance, in one embodiment, the intermediate rail 16 may be defined or formed by overlapping portions of the first and second shade panels 18, 20 forming a joint or connection location between such panels 18, 20 and/or by any suitable joint structure, material and/or joining member or means provided at a joint or connection location defined between the first and second shade panels 18, 20 (e.g., adhesives, tapes, etc.).

Additionally, the disclosed covering 10 may also include an operating system associated with each respective shade panel 18, 20 for facilitating extension and retraction of the shade panel 18, 20 relative to the adjacent architectural structure. For instance, as shown in FIG. 1, a first operating system 40 is supported within or otherwise provided in operative association with the headrail 12 (or the roller 28 positioned within the headrail 12) to allow the first shade panel 18 to be extended and retracted. For instance, when the first shade panel 18 is configured as a roller shade panel, the first operating system 40 may be provided in operative association with the corresponding roller 28 to allow extension/retraction of the first shade panel 18 via corresponding rotation of the roller 28. Additionally, as shown in FIG. 1, the covering 10 includes a second operating system 50 to allow the second shade panel 20 to be extended and retracted between the intermediate rail 16 and the bottom rail 14. In the illustrated embodiment, the second operating system 50 is supported within or otherwise provided in operative association with the bottom rail 14. However, in other embodiments, the second operating system 50 may be supported within or otherwise provided in operative association with the intermediate rail 16.

In accordance with aspects of the present subject matter, the first and second operating systems 40, 50 may correspond to unbalanced operating systems or balanced operating systems. In general, an unbalanced operating system requires a brake or locking mechanism to retain the associated shade panel at a desired position or degree of extension. For instance, the torsion spring, spring motor, and/or other drive source for the operating system may be underpowered (e.g., due to the upward force applied by the drive source being insufficient to hold the rail to which the lower end of the shade panel is coupled in place once released by the user) or overpowered (e.g., due to the upward force applied by the drive source causing the rail to which the lower end of the shade panel is coupled to be raised once released by the user), thereby requiring a brake or locking mechanism to allow the shade panel to be maintained at the user-selected position. In contrast, a balanced operating system allows the associated shade panel to be adjusted to any position or degree of extension without requiring a brake or locking mechanism to retain the shade panel at such position. For instance, the force applied by the torsion spring, spring motor, and/or other drive source for the operating system may vary based on the position or degree of extension of the shade panel(s) to maintain a balanced state (i.e., by preventing an underpowered or overpowered condition).

In embodiments in which the first shade panel 18 comprises a roller shade panel, the first operating system 40 may correspond to an unbalanced or balanced roller operating system provided in operative association with the roller 28. For instance, in the illustrated embodiment of FIG. 1, the first operating system 40 is configured as an unbalanced roller operating system including a stationary roller shaft 42 (e.g., by being anchored to the headrail 12 or any other fixed component), a helically wound torsion spring 44, and a roller lock mechanism 46 positioned within or otherwise provided in operative association with the roller 28. In such an embodiment, the torsion spring 44 may, for instance, have one end coupled for rotation with the roller 28 and an opposed end coupled to the roller shaft 42 (e.g., via a spring plug 48) to allow the spring 44 to be wound to store energy as the first shade panel 18 is extended and unwound to release energy as the first shade panel 18 is retracted. Additionally, in one embodiment, the roller lock mechanism 46 may, for instance, be coupled between the roller shaft 42 and the roller 28 to selectively engage the roller 28 with the roller shaft 42 to lock the roller 28 in position when the first shade panel 18 is moved to a desired position, thereby preventing further rotation of the roller 28 until the user provides a downward operating force against the roller (e.g., by pulling down on the first shade panel 18 or the intermediate rail 16) to disengage or unlock the roller 28 from the roller shaft 42. In one embodiment, the roller lock mechanism 46 may be configured as a clutch assembly that provides for selective engagement between the roller shaft 42 and the roller 28. An example of a clutch assembly suitable for use as a roller lock mechanism and an associated unbalanced roller operating system is disclosed in US Patent Pub. No. 2018/0179812 (Dubina et al.), the disclosure of which is hereby incorporated by reference herein in its entirety for all purposes.

Alternatively, for a balanced roller operating system, the helically wound torsion spring 44 may form part of a counter-balancing device for storing a variable torque that is complementary to or matches the variable weight of the first shade panel 18 (and the components suspended therefrom) as the first shade panel 18 is extended to varying degrees. For instance, the torque stored by the spring 44 may generally increase with increases in the suspended weight as the first shade panel 18 is extended or unwound from the roller 28. Such variable torque provided by the torsion spring 44 may serve to counterbalance the operating system or otherwise maintain the system within a balanced state, thereby allowing the first shade panel 18 to be maintained at any desired position or degree of extension selected by a user without requiring a brake or locking mechanism. An example of a suitable balanced roller operating system is disclosed in U.S. Pat. No. 10,138,676 (Bohlen et al.), the disclosure of which is hereby incorporated by reference herein in its entirety for all purposes.

Similarly, the second operating system 50 may correspond to an unbalanced or balanced operating system. For instance, in the illustrated embodiment of FIG. 1, the second operating system 50 is configured as an unbalanced operating system for extending and retracting the second shade panel 20 between the intermediate and bottom rails. Specifically, as shown in FIG. 1, the operating system includes a pair of lift cords 52 extending between the intermediate and bottom rails 16, 14 through the interior of the cellular blanket, with an upper end 52A of each lift cord 52 being coupled to the intermediate rail 16 to allow the bottom rail 14 to be suspended relative to the intermediate rail 16 via the lift cords 52. Additionally, the operating system 50 includes a lift rod 54, a pair of lift spools 56 (one for each lift cord 52) coupled for rotation with the lift rod 54, and a spring motor 58 operatively coupled to the lift rod 54 for rotationally driving such rod 54, with the spring motor 58 being configured to store energy as the bottom rail 14 is lowered relative to the intermediate rail 16 to extend the second shade panel 20 and release such energy when the bottom rail 14 is being raised relative to the intermediate rail 16 to retract the second shade panel 20. Moreover, as shown, the operating system 50 includes a brake or lock 60 operatively coupled to the lift rod 54 in a manner that allows the lock 60 to selectively engage the lift rod. For instance, the lock 60 may include or be coupled to an operator or user-actuatable component (e.g., a button 62) that allows the lock 60 to be actuated between a locked or engaged position, at which the lock 60 engages the lift rod 54 so as to prevent rotation of the lift rod 54, and an unlocked or disengaged position, at which the lock 60 disengages the lift rod 54 to allow rotation of the lift rod 54 (and, thus, allow the rod 54 to rotationally drive the lift spools 56 for winding or unwinding the lift cords 52 relative thereto). Embodiments of exemplary lock/button arrangements and related unbalanced operating systems are described, for example, in U.S. Pat. No. 9,422,766 (Anderson et al.) and U.S. Pat. No. 9,708,850 (Anderson et al.), both of which are hereby incorporated by reference herein in their entirety for all purposes.

Alternatively, to configure the second operating system 50 as a balanced system, the spring motor 58 may form part of a counterbalance device or mechanism configured to store a variable torque that is complementary to or matches the variable weight of the second shade panel 20 as the shade panel 20 is extended to varying degrees. For instance, the torque stored by the spring of the spring motor 58 may generally increase with increases in the suspended weight as the bottom rail 14 is moved away from the intermediate rail 16 to extend the second shade panel 20. Such variable torque provided by the spring motor 58 may serve to counterbalance the operating system, thereby allowing the second shade panel 20 to be maintained at any desired position or degree of extension selected by a user without requiring a brake or locking mechanism. An embodiment of an exemplary balanced operating system is described, for example, in U.S. Pat. No. 6,536,503 (Anderson et al.), which is hereby incorporated by reference herein in its entirety for all purposes.

It should be appreciated that, although the various components of the second operating system 50 are shown as being supported within or otherwise provided in operative association with the bottom rail 14, such operating system components may, instead, be supported within or otherwise provided in operative association with the intermediate rail 16. For instance, the lift rod 54, lift spools 56, spring motor 58, and lock assembly (including the lock 60 and associated button 62) may be installed within and/or on the intermediate rail 16 to allow the second shade panel 20 to be extended and retracted.

It should also be appreciated that, by configuring the hybrid covering 10 to include two shade panels 18, 20 with independent operating systems 40, 50, the covering 10 can provide an increased drop length as opposed to conventional covering 10. For instance, in one embodiment, the covering 10 may provide an overall drop length that is twice as long as a conventional covering.

In several embodiments, the operating force required to extend the first and second shade panels 18, 20 via their respective operating systems 40, 50 may differ. Specifically, in accordance with aspects of the present subject matter, the first operating system 40 may require a first minimum operating force (indicated by arrow 70 in FIG. 2) to be applied thereto to extend the first shade panel 18 (e.g., a downward force applied through the first shade panel 18 via the intermediate or bottom rail 16, 14) and the second operating system 50 may require a second minimum operating force (indicated by arrow 72 in FIG. 2) to be applied thereto to extend the second shade panel 20 (e.g., a downward force applied to the bottom rail 14), with the first minimum operating force 70 being greater the second minimum operating force 72. By configuring the first operating system 40 to require a greater operating force to be applied thereto to extend the first shade panel 18, the second shade panel 20 may be extended without extending the first shade panel 18 (e.g., by applying a downforce force on the bottom rail 14 that is less than the first minimum operating force 70). As such, the second shade panel 20 may be extended relative to the intermediate rail 16 via a one-handed operation (e.g., by simply grasping the bottom rail 14) without inadvertently or unintentionally extending the first shade panel 18.

For instance, in the illustrated embodiment of FIG. 1, the first and second operating systems 40, 50 are both configured as unbalanced operating systems. In such an embodiment, the spring motor 58 of the second operating system 50 may be designed to be weaker than the torsion spring 44 of the first operating system 40, thereby requiring less downward force to be applied to the bottom rail 14 to extend the second shade panel 20 than the first shade panel 18. As a result, with the covering 10 in the fully retracted position (e.g., as shown in FIG. 3), the second shade panel 20 may be extended independent of the first shade panel 18 (e.g., to the position shown in FIG. 5) by disengaging the lock 60 of the second operating system 50 (e.g., by actuating the associated button 62 provided on the bottom rail 14) and by pulling the bottom rail 14 downward relative to both the headrail 12 and the intermediate rail 16 with an operating force that is less than the minimum operating force 70 required to extend the first shade panel 18. In contrast, with the covering in the fully retracted position (e.g., as shown in FIG. 3), the first shade panel 18 may be extended independent of the second shade panel 20 (e.g., to the position shown in FIG. 4) by pulling the bottom rail 14 downward relative to the headrail 12 with an operating force that is equal to or greater than the minimum operating force 70 required to extend the first shade panel 18 while the lock 60 of the second operating system 50 remains engaged to prevent the second shade panel 20 from being extended (or, alternatively, by pulling the intermediate 16 downward relative to the headrail 12 with the required operating force 70).

It should be appreciated that such independent extension of each shade panel 18, 20 may be achieved with the other shade panel disposed at any suitable position. For instance, with the first shade panel 18 partially extended (e.g., to the position shown in FIG. 2), the second shade panel 20 may again be extended independent of the first shade panel 18 (e.g., to the extended position shown in FIG. 2) by disengaging the lock 60 of the second operating system 50 and by pulling the bottom rail 14 downward with an operating force that is less than the minimum operating force 70 required to extend the first shade panel 18. Similarly, with the second shade panel 20 partially extended relative to the intermediate rail 16 (e.g., to the position shown in FIG. 2), the first shade panel 18 may be extended independent of the second shade panel 20 (e.g., to the position shown in FIG. 2) by pulling the bottom rail 14 downward with an operating force that is equal to or greater than the minimum operating force 70 required to extend the first shade panel 18 while the lock 60 of the second operating system 50 remains engaged (or, alternatively, by pulling the intermediate 16 downward relative to the headrail 12 with the required operating force 70).

Figure 6:
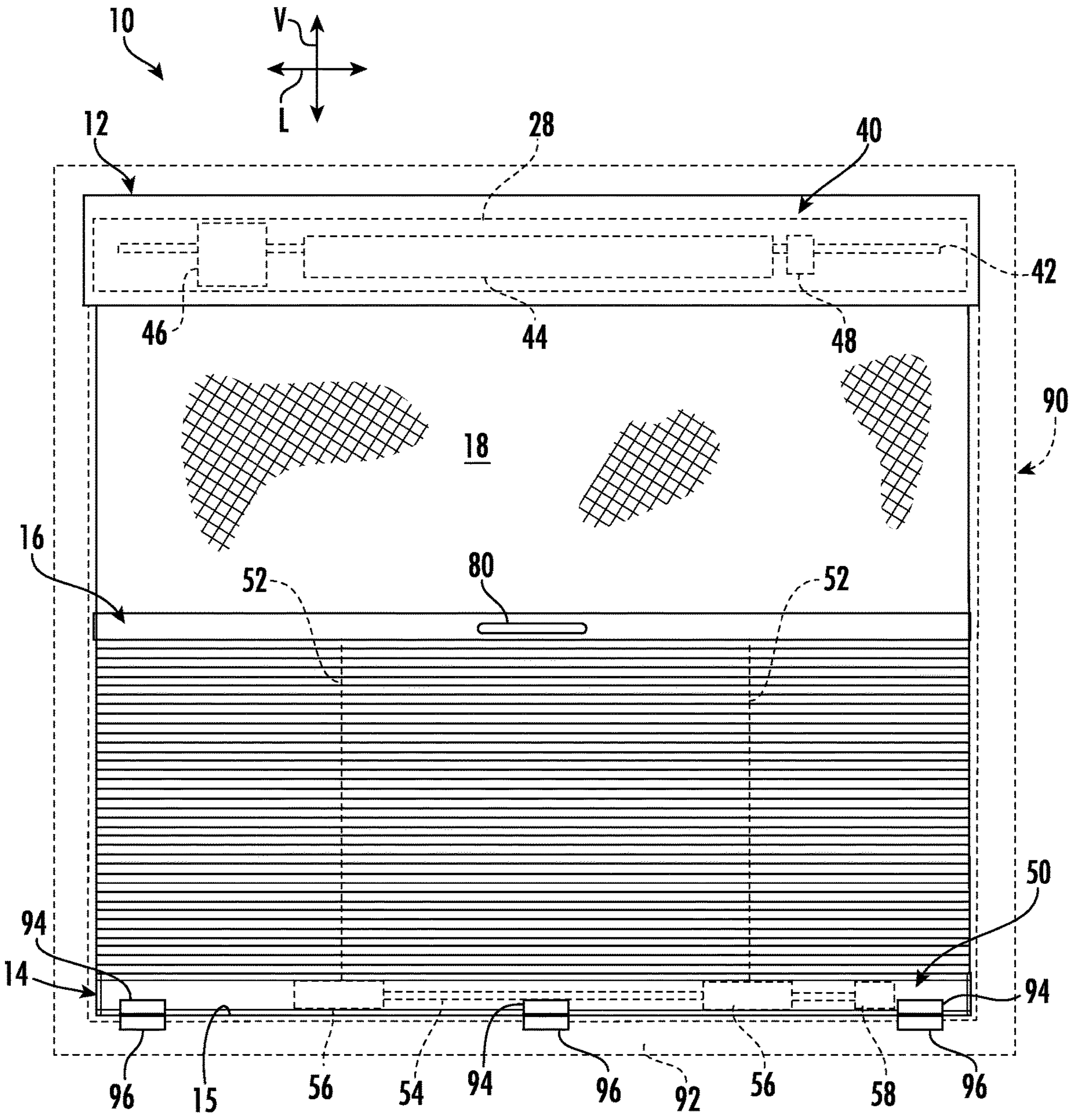
FIG. 6 illustrates a front view of another embodiment of a hybrid covering for an architectural structure in accordance with aspects of the present subject matter, particularly illustrating first and second shade panels of the covering at partially extended positions.
Figure 7:
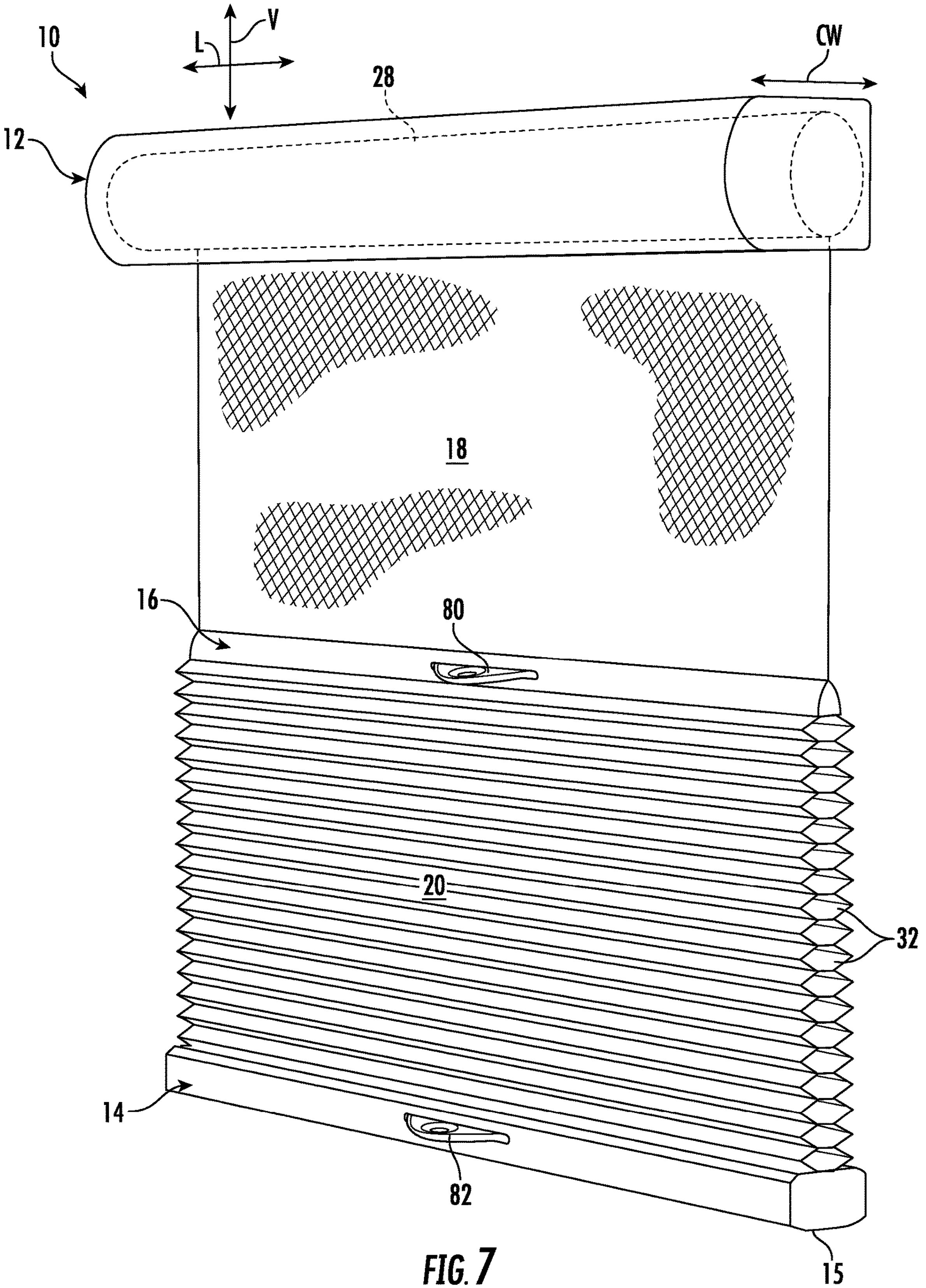
FIG. 7 illustrates a perspective view of the covering shown in FIG. 6.

In other embodiments, at least one of the operating systems 40, 50 may correspond to a balanced operating system. For instance, FIGS. 6 and 7 illustrate an embodiment of the disclosed covering 10 in which the second operating system 50 is configured as a balanced operating system, thereby allowing the lock assembly described above (including the lock and associated actuator button) to be removed from the operating system 50. In such an embodiment, the first operating system 40 may correspond to an unbalanced or balanced operating system. By configuring the second operating system 50 as a balanced operating system, the second shade panel 20 may be moved between its extended and retracted positions by pulling the bottom rail 14 down relative to the intermediate rail 16 or by adjusting the position of the intermediate rail 16 relative to the bottom rail 14.

For instance, with the shade panels 18, 20 disposed at the positions shown in FIG. 7, the first shade panel 18 may be extended while retracting the second shade panel 20 (e.g., to achieve similar shading characteristics as that shown in FIG. 4) by simply moving the intermediate rail 16 downwardly away from the headrail 12 and towards the bottom rail 14 (e.g., via a handle 80 provided on the rail 16), thereby resulting in the second shade panel 20 being collapsed or retracted between the intermediate and bottom rails 16, 14 as the first shade panel 18 is being extended. Similarly, the second shade panel 20 may be extended while retracting the first shade panel 18 (e.g., to achieve similar shading characteristics as that shown in FIG. 5) by simply moving the intermediate rail 16 upwardly towards the headrail 12 and away from the bottom rail 14, thereby resulting in the first shade panel 18 being retracted as the second shade panel 20 is extended with such upward movement of the intermediate rail 16 relative to the bottom rail 14. When extending the second shade panel 20 from the position shown in FIG. 7, the initial required movement of the intermediate rail 16 may vary depending on whether the first operating system 40 is unbalanced or balanced. For instance, with the first operating system 40 configured as an unbalanced operating system, the intermediate rail 16 may need to be initially pulled slightly downwardly to unlock the associated brake or locking mechanism of the first operating system 40 and allow the first shade panel 18 to retract as the intermediate rail 16 is subsequently moved upwardly towards the headrail 12 to extend the second shade panel 20. Alternatively, with the first operating system 40 configured as a balanced operating system, the intermediate rail 16 may simply be moved upwardly towards the headrail 12 to extend the second shade panel 20, as the balanced operating system will not require that a brake or locking mechanism be disengaged.

In embodiments in which the second operating system 50 is configured as a balanced operating system, it may be desirable to provide the ability to secure the bottom rail 14 to a portion of the adjacent architectural structure, thereby allowing the bottom rail 14 to be fixed in position relative to the architectural structure. By doing so, the intermediate rail 16 may be moved upwardly and downwardly between the headrail 12 and the bottom rail 14 to adjust the degree of extension of the first and second shade panels 18, 20 without requiring that the bottom rail 14 be held in position by the user. For instance, in the illustrated embodiment of FIG. 6, the disclosed covering is shown installed relative to a window frame 90. In one embodiment, magnets may be used to couple the bottom rail 14 to a portion of the frame 90, such as the bottom portion of the frame 90. Specifically, one or more magnets may be provided in operative association with either the bottom rail 14 or the frame 90, while one or more magnet-engaging elements may be provided in operative association with the other of the bottom rail 14 or the frame 90 to allow the bottom rail 14 to be held in position with the frame. For instance, in the illustrated embodiment, a plurality of magnets 94 are provided in operative association with and spaced apart along a bottom wall 15 of the bottom rail 14 (e.g., by being coupled to, recessed within and/or extending through the bottom wall 15) and a plurality of corresponding magnet-engaging elements 96 (e.g., magnets or suitable metallic components, such as steel plates or magnet striker plates) are positioned on or within a bottom frame member 92 of the window frame 90 such that, when the bottom rail 14 is moved to the bottom of the frame 90, the aligned pairs of magnets/magnet-engaging elements 94, 96 magnetically engage each other, thereby securing the bottom rail 14 to the frame 90. In such an embodiment, with the bottom rail 14 coupled to the bottom frame member 92 of the frame 90, the position of the intermediate rail 16 can be adjusted freely to vary the degree of extension of the first and second shade panels 18, 20 without any unintended motion (e.g., upward movement) of the bottom rail 14.

It should be appreciated that, as an alternative to magnets, any other suitable structure(s), mechanism(s), and/or device (s) may be used as a means for coupling or securing the bottom rail 14 to a frame or other portion of the adjacent architectural structure. For instance, in other embodiments, straps, tie downs, clips, hooks, locking brackets, and/or the like may be provided in operative association with the bottom rail 14 and/or the frame (or other portion of the architectural structure) to allow the bottom rail 14 to be coupled to or otherwise fixed in position relative to the adjacent architectural structure.

It should also be appreciated that, as an alternative to using the intermediate rail 16 to simultaneously extend/retract the first and second shade panels 18, 20 when the second operating system 50 is configured as a balanced system, the bottom rail 14 may be used to independently extend/retract the second shade panel 20. For instance, the bottom rail 14 may be grasped (e.g., via a handle 82 (FIG. 7) provided on the bottom rail 14) and moved upwardly or downwardly relative to the intermediate rail 16 to retract or extend the second shade panel 20, respectively. In doing so, it may be desirable to grasp the intermediate rail 16 (e.g., via its handle 80) to hold such rail 16 in place as the bottom rail 14 is being moved relative thereto.

Additionally, it should be appreciated that, in alternative embodiments, it may be desirable to incorporate a lock assembly (e.g., the lock 60 and associated button 62 described above) in association with the second operating system 40 even in instances in which such operating system is configured as a balanced system. For instance, in one embodiment, the lock assembly may be configured to lock the second operating system 40 upon actuation of the associated button 62 (as opposed to unlocking the second operating system 40 as described above with reference to the unbalanced system). In such an embodiment, to extend/retract the second shade panel 20, the same methods described may be utilized, such as by using the intermediate rail 16 to simultaneously extend/retract the first and second shade panels 18, 20 or by moving the bottom rail 14 upwardly or downwardly relative to the intermediate rail 16 to retract or extend the second shade panel 20 independent of the first shade panel 18. Additionally, in such embodiment, to extend/retract the first shade panel 18 independent of the second shade panel 20, the user may actuate the associated button 62 of the lock assembly (thereby locking the second operating system 40 and, thus, preventing extension/retraction of the second shade panel 20) and simply pull down on the bottom rail 14 to extend the first shade panel 18 or move the bottom rail 14 upwardly to retract the first shade panel 18. In the event that the first operating system 40 is configured as an unbalanced operating system, the bottom rail 14 may need to be initially pulled slightly downwardly to unlock the associated brake or locking mechanism of the first operating system 40 before moving the bottom rail 14 upwardly to retract the first shade panel 18.

Moreover, in addition to allowing the position of the intermediate rail 16 to be freely adjusted between the headrail 12 and the bottom rail 14, the ability to couple the bottom rail 14 to the adjacent architectural structure may, in certain implementations, facilitate the use of a motorized operating system. For instance, in one embodiment, the first operating system 40 may be configured as a motorized operating system that automatically extends and retracts the first shade panel 18 upon activation of the associated motor, such as by providing a motor configured to automatically rotate the roller 28 to allow the first shade panel 18 to be wound around and unwound from the roller 28. In such an embodiment, with the bottom rail 14 fixed in position relative to the adjacent architectural structure (e.g., by using the magnets 94, 96 shown in FIG. 6), the motorized operating system may be operated to retract or extend the first shade panel 18, which, in turn, results in upward or downward movement of the intermediate rail 16, respectively, thereby causing corresponding extension or retraction of the second shade panel 20. For instance, with the second operating system 50 configured as a balanced operating system, the intermediate rail 16 may be sufficiently weighted such that the second shade panel 20 retracts as the intermediate rail 16 is moved downwardly with extension of the first shade panel 18. It should be appreciated that use of a motorized operating system for the first operating system 40 may be advantageous, for example, with taller windows requiring larger drop lengths. Specifically, the motorized operating system will not be constrained by the practical limitations of cord spooling systems and/or size requirements for spring motors. Thus, by configuring the hybrid covering to include a motorized operating system in association with the upper rail, the arrangement allows for a significantly increased drop length (e.g., double the drop length) given the two independent operating systems, while still allowing manual operation of the second shade panel 20 for taller windows as the bottom rail 14 and panel 20 are lowered into reach via operation of the motor.

Figure 8:
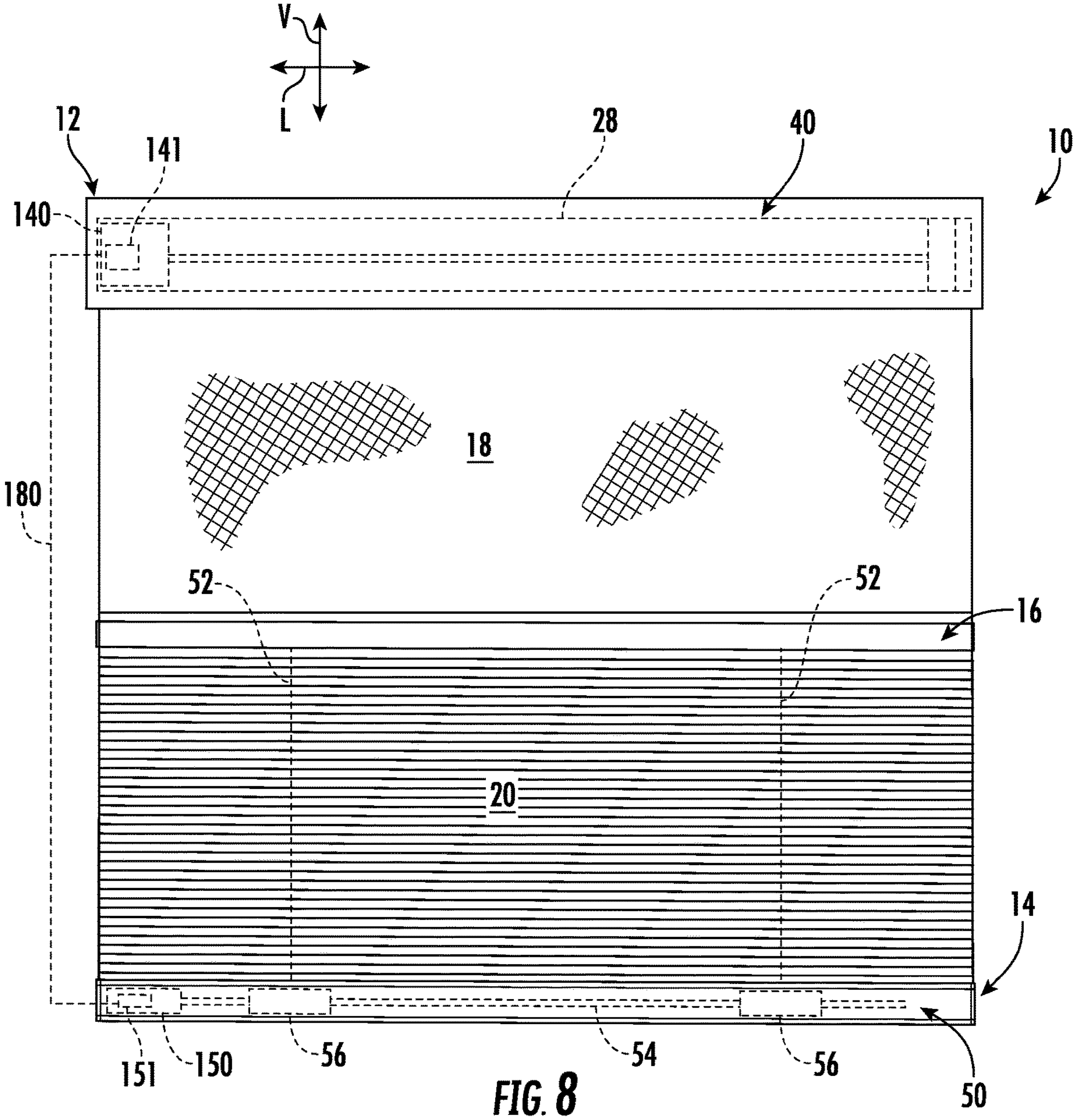
FIG. 8 illustrates a front view of another embodiment of a hybrid covering for an architectural structure in accordance with aspects of the present subject matter, particularly illustrating first and second shade panels of the covering at partially extended positions.

Alternatively, the first and second operating systems 40, 50 may be both configured as motorized operating systems. For instance, FIG. 8 illustrates an embodiment of the disclosed covering 10 in which the first operating system 40 and the second operating system 50 are configured as motorized operating systems. Specifically, as shown, a first electric motor 140 is provided in operative association with the first operating system 40 while a second electric motor 150 is provided in operative association with the second operating system 50. For instance, the first electric motor 140 may be configured to rotationally drive the roller tube 28 for extending/retracting the first shade panel 18. Similarly, the second drive motor 150 may be configured to rotationally drive one or more associated components of the second operating system 50, such as the lift rod 54 and associated lift spools 56.

In several embodiments, the motors 140, 150 may be communicatively coupled to each other via a communicative link 180 (e.g., via a wired or wireless connection) to allow for synchronized or coordinated operation of the motors 140, 150 when extending/retracting the covering 10. In one embodiment, each motor 140, 150 may be provided with a motor controller 141, 151 that incorporates or is coupled to a wireless communications device (e.g., a transceiver) to facilitate communications or data transfer between the motors 140, 150. Such wireless communications may also facilitate communications or data transfer between each motor 140, 150 and a separate control device, thereby allowing the operation of the motors 140, 150 to be remotely controlled by such device. For instance, a stand-alone remote control device (e.g., an RF-based or IR-based remote control device) or a personal computing device (e.g., a smart phone, tablet, laptop, etc.) may be used to remotely control the operation go each motor 140, 150.

With both operating systems 40, 50 configured as motorized operating systems, the manner in which the motors 140, 150 are operated (e.g., independently or simultaneously) will generally vary depending on the extended/retracted state of the covering 10. For instance, with the shade panels 18, 20 disposed at the positions shown in FIG. 8, the first shade panel 18 may be extended while retracting the second shade panel 20 (e.g., to achieve similar shading characteristics as that shown in FIG. 4) by operating the first motor 141 to rotationally drive the first operating system 40 in an extension direction (e.g., such that the first shade panel 18 is unwound from the roller 28) while simultaneously operating the second motor 151 to rotationally drive the second operating system 50 in a retraction direction (e.g., such that the lift cords 52 are wound around the lift spools 56), thereby resulting in the second shade panel 20 being collapsed or retracted between the intermediate and bottom rails 16, 14 as the first shade panel 18 is being extended. Similarly, the second shade panel 20 may be extended while retracting the first shade panel 18 (e.g., to achieve similar shading characteristics as that shown in FIG. 5) by operating the first motor 141 to rotationally drive the first operating system 40 in a retraction direction (e.g., such that the first shade panel 18 is wound around the roller 28) while simultaneously operating the second motor 151 to rotationally drive the second operating system 50 in an extension direction (e.g., such that the lift cords 52 are unwound from the lift spools 56), thereby resulting in the first shade panel 18 being retracted as the second shade panel 20 is extended with such upward movement of the intermediate rail 16 relative to the bottom rail 14. In contrast, when the covering 10 is in a fully retracted state (e.g., similar to that shown in FIG. 3), the first shade panel 18 or the second shade panel 20 may be extended independently by only operating its respective motor 141, 151 (i.e., the first motor 141 to extend the first shade panel 18 or the second motor 151 to send the second shade panel 120). Similarly, with the first shade panel 18 fully extended and the second shade panel 20 fully retracted (e.g., similar to that shown in FIG. 4), the first motor 141 may be operated in isolation to retract the first shade panel 18 and, with the first shade panel 18 fully retracted and the second shade panel 20 fully extended (e.g., similar to that shown in FIG. 5), the second motor 151 may be operated in isolation to retract the second shade panel 20.

Figure 9:
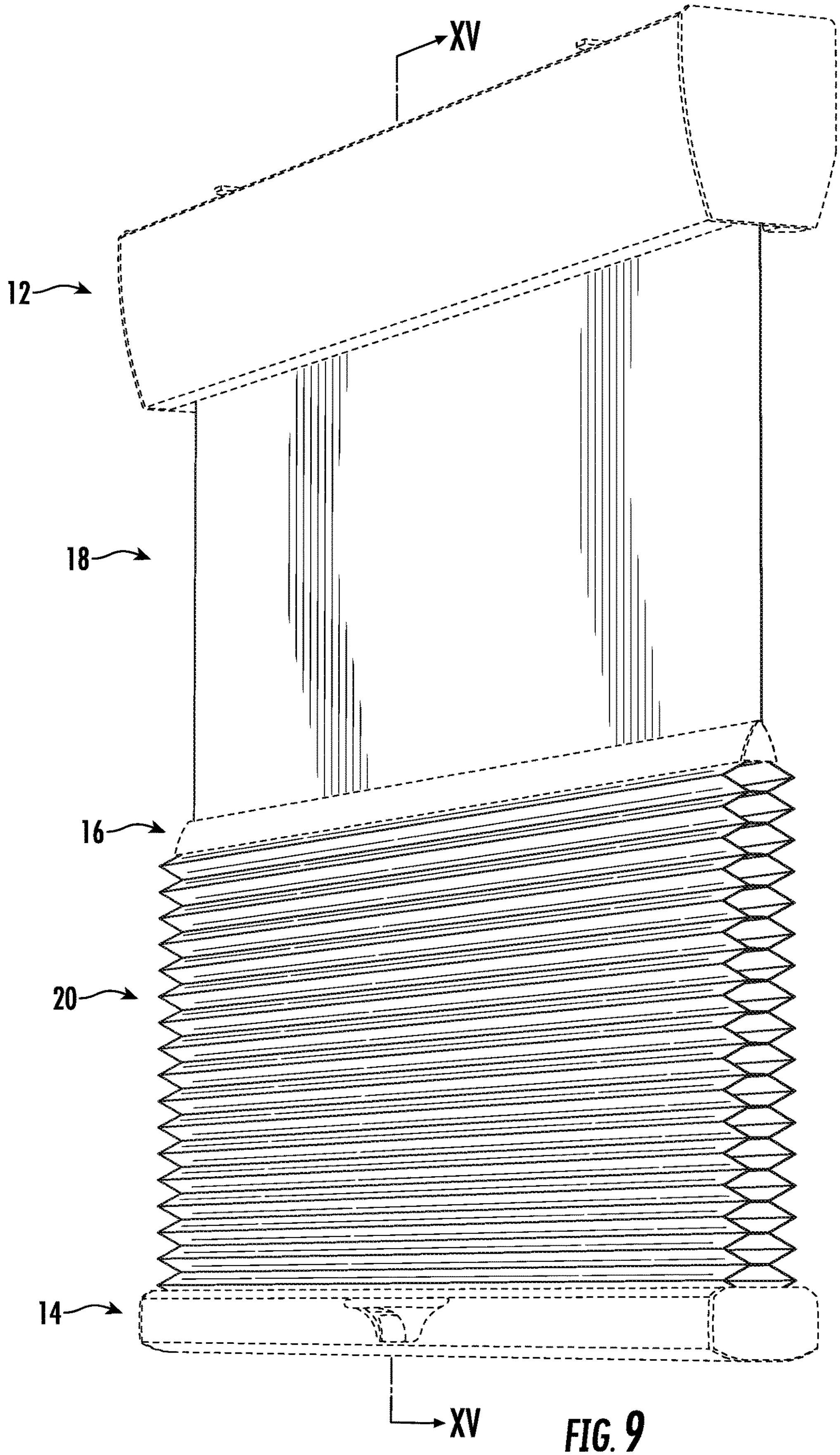
FIGS. 9-14 illustrate various different views of a further embodiment of a hybrid covering for an architectural structure in accordance with aspects of the present subject matter, particularly illustrating first and second shade panels of the covering at partially extended positions.
Figure 10:
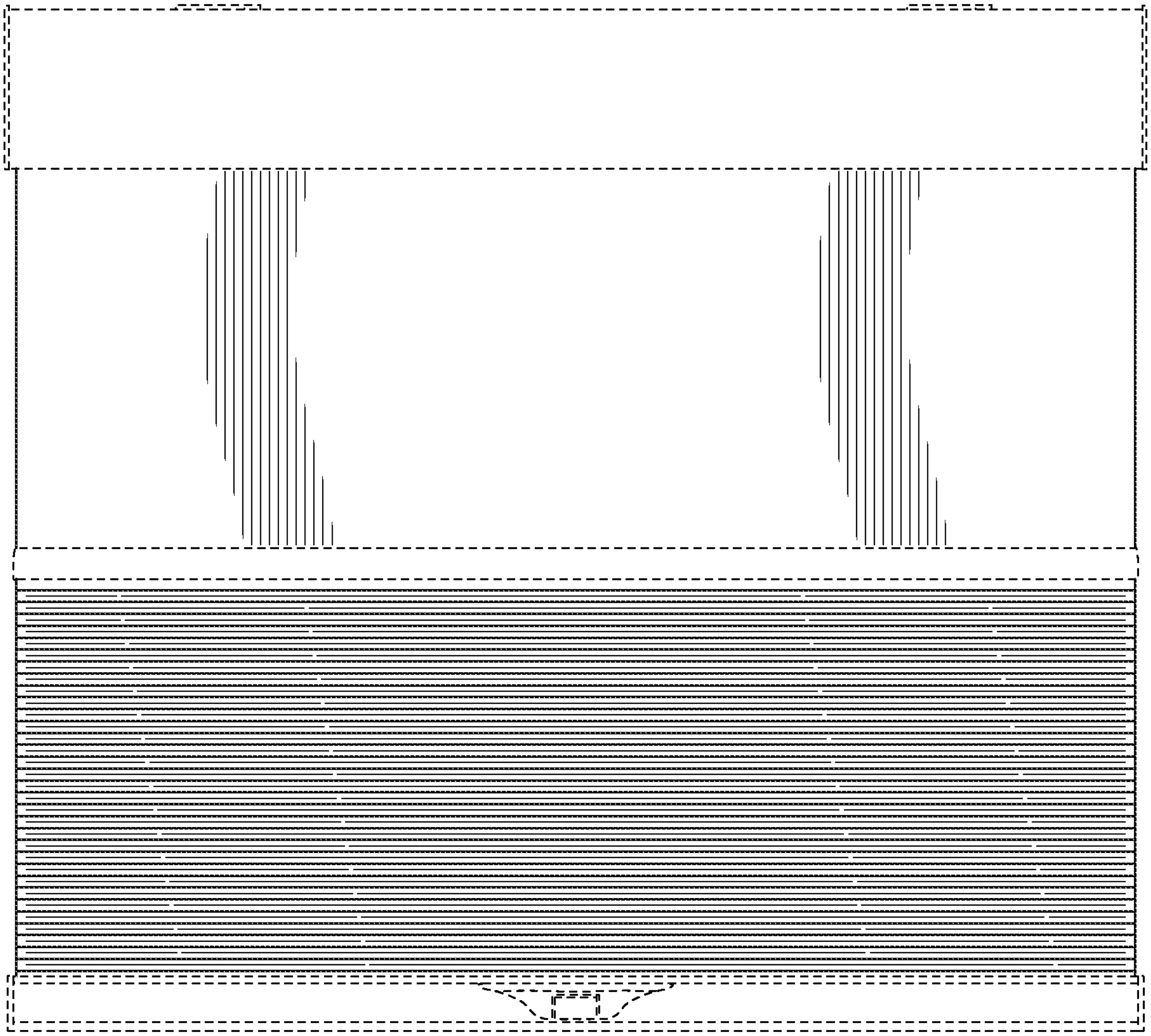
Figure 11:
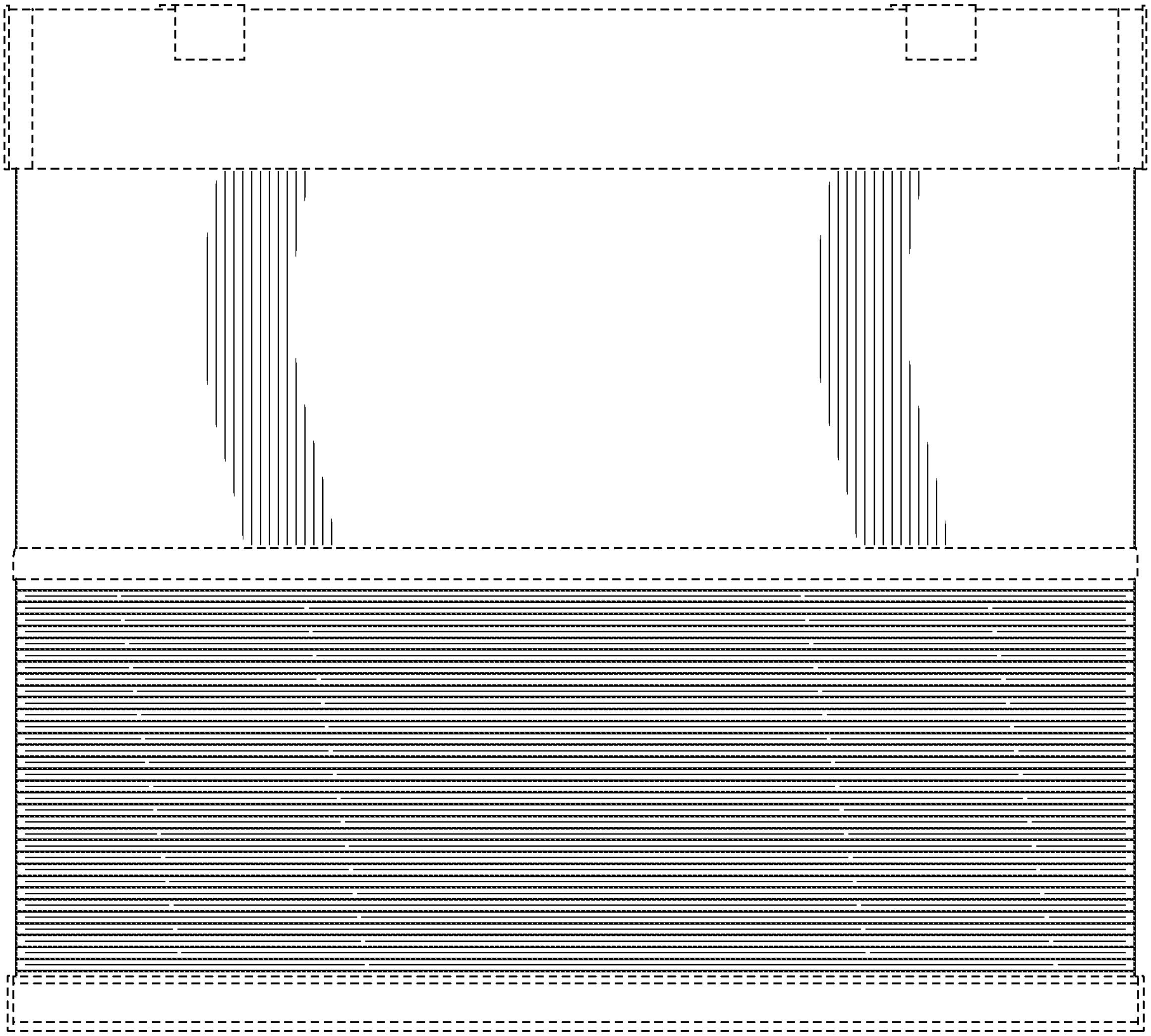
Figure 13:
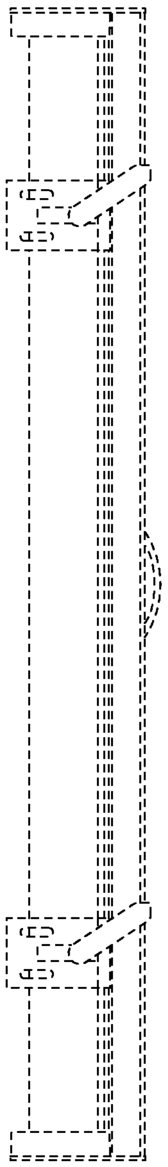
Figure 14:
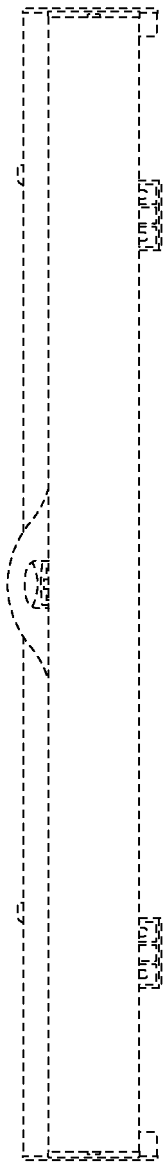
Figure 12:
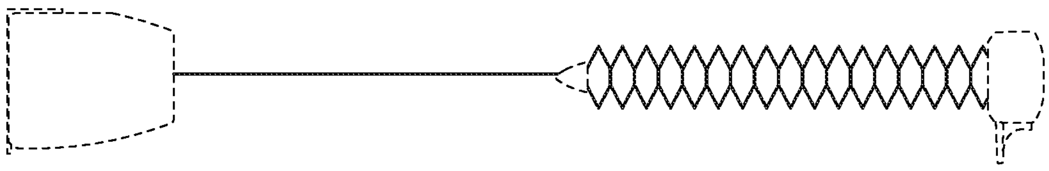
Figure 15:
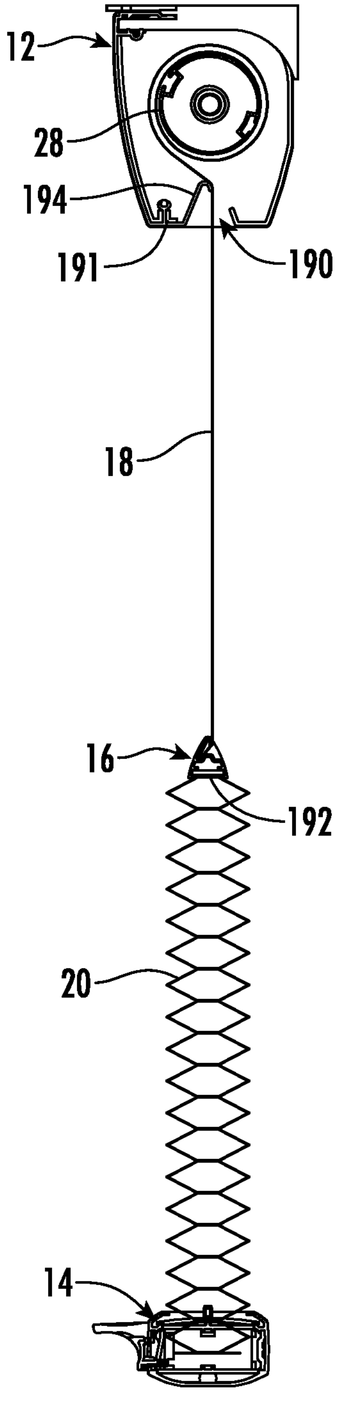
FIG. 15 illustrates a cross-sectional view of the hybrid covering shown in FIG. 9.
Figure 16:
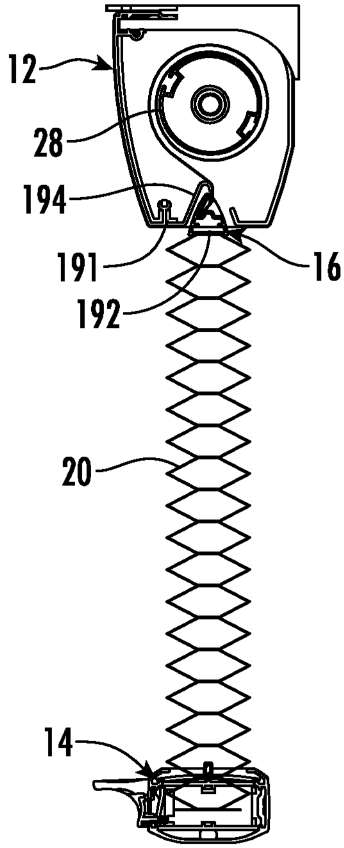
FIG. 16 illustrates a similar cross-sectional view of the hybrid covering shown in FIG. 16 with the first shade panel fully retracted.

Referring now to FIGS. 9-16, various views of yet another embodiment of a hybrid covering 10 for an architectural structure are illustrated in accordance with aspects of the present subject matter. Specifically, FIG. 9 illustrates a perspective view of the covering 10, particularly illustrating first and second shade panels of the covering 10 at partially extended positions and the rails of the covering 10 being shown in dashed lines, while FIGS. 10-14 illustrates front, rear, right side (with the left side being a mirror image thereof), top, and bottom views, respectively, of the covering 10 shown in FIG. 9. Additionally, FIG. 15 illustrates a cross-sectional view of the covering 10 shown in FIG. 9 taken about line XV-XV, while FIG. 16 illustrates a similar cross-sectional view of the covering 10 as that shown in FIG. 15 with the first shade panel being fully retracted.

As particularly shown in FIG. 9, the covering 10 is generally configured the same as or similar to the various covering embodiments described above. For instance, the covering includes an upper rail (e.g., in the form of a headrail 12), a bottom rail 14, and an intermediate rail 16 positioned between the headrail 12 and the bottom rail 14. Additionally, the covering 10 includes first and second shade panels 18, 20, with the first shade panel 18 being supported between the headrail 12 and the intermediate rail 16 to allow the first shade panel 18 to be extended and retracted, as desired, relative to the headrail 12 and the second shade panel 20 being supported between the intermediate rail 16 and the bottom rail 14 to allow the second shade panel 20 to be extended and retracted, as desired, between such rails 16, 14. The shade panels 18, 20 and related operating systems for extending/retracting the shade panels 18, 20 may generally be configured the same as or similar to any of the various embodiments described herein.

Additionally, in several embodiments, the headrail 12 may be configured to accommodate the intermediate rail 16 in a recessed state or position when the first shade panel 18 is fully retracted. For instance, as particularly shown in FIG. 15, the headrail 12 includes a downwardly facing channel 190 that is recessed relative to a bottom face or side 191 of the headrail 12, with the recessed channel 90 being configured to receive all or a portion of the intermediate rail 16. Thus, as the first shade panel 18 is being wound around the roller 28 to move the panel 18 to its fully retracted state, the intermediate rail 16 may be lifted into and received within the channel 190 such that at least a portion of the intermediate rail 16 is recessed relative to the bottom face or side 191 of the headrail 12. For instance, as particularly shown in FIG. 16, the intermediate rail 16 may be configured to be received within the recessed channel 190 such that a bottom end 192 of the intermediate rail 16 is generally aligned with (e.g., flush with) the bottom side 191 of the headrail 12, thereby concealing the intermediate rail 16 from view when the first shade panel 18 is fully retracted. Moreover, as particularly shown in FIG. 15, at least a portion of the recessed channel 190 may be formed or defined by a catch wall 194 of the headrail 12 that functions as a stop member or mechanical stop to limit the upward movement of the intermediate rail 16 into the interior of the headrail 12.

Figure 17:
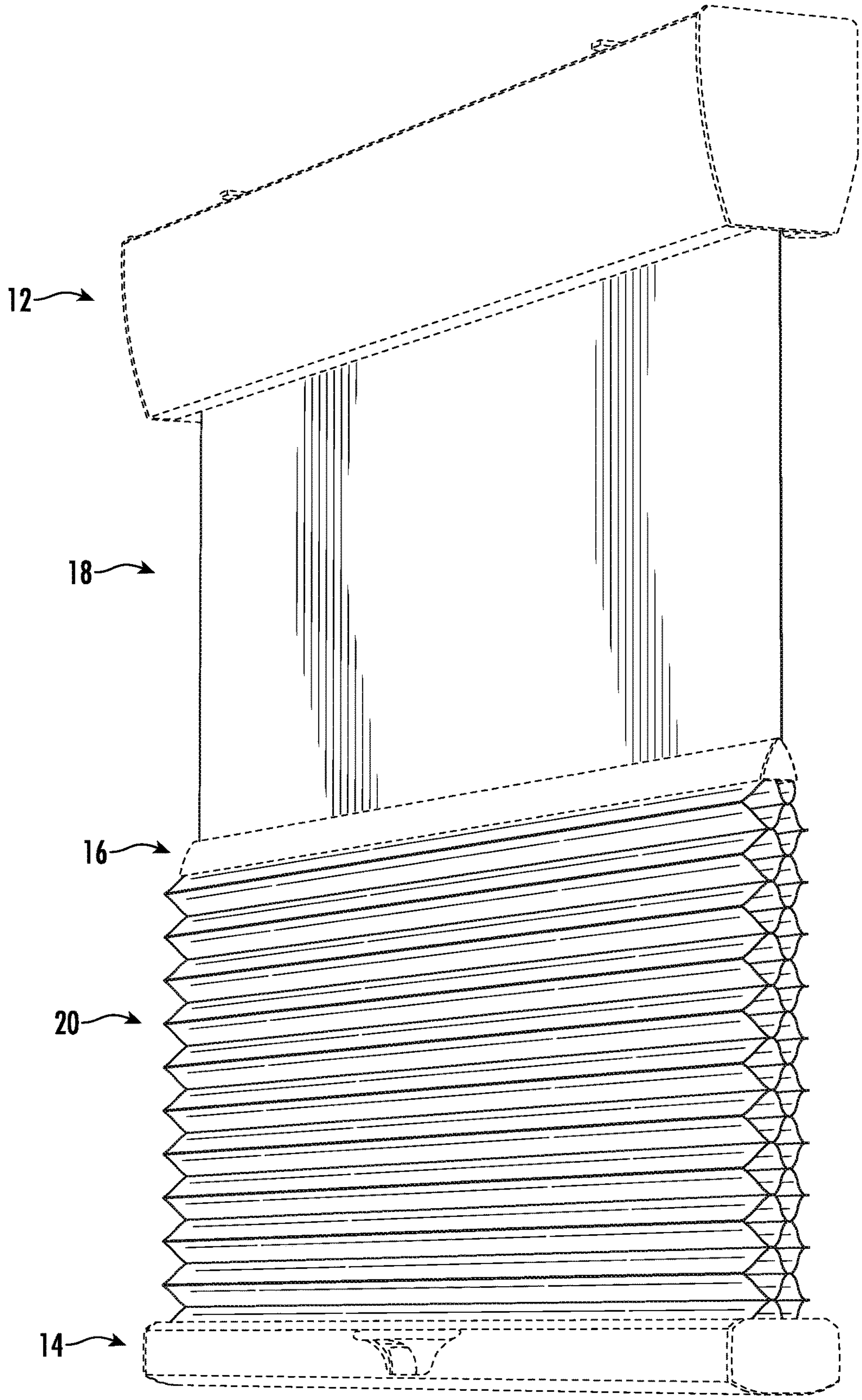
FIGS. 17-22 illustrate various different views of another embodiment of a hybrid covering for an architectural structure in accordance with aspects of the present subject matter, particularly illustrating first and second shade panels of the covering at partially extended positions.

Referring now to FIGS. 17-22, various views of a further embodiment of a hybrid covering 10 for an architectural structure are illustrated in accordance with aspects of the present subject matter. Specifically, FIG. 17 illustrates a perspective view of the covering 10, particularly illustrating first and second shade panels of the covering 10 at partially extended positions and the rails of the covering 10 being shown in dashed lines, while FIGS. 18-22 illustrates front, rear, right side (with the left side being a mirror image thereof), top, and bottom views, respectively, of the covering 10 shown in FIG. 17.

As particularly shown in FIG. 17, the covering 10 is generally configured the same as or similar to the various covering embodiments described above. For instance, the covering includes an upper rail (e.g., in the form of a headrail 12), a bottom rail 14, and an intermediate rail 16 positioned between the headrail 12 and the bottom rail 14. Additionally, the covering 10 includes first and second shade panels 18, 20, with the first shade panel 18 being supported between the headrail 12 and the intermediate rail 16 to allow the first shade panel 18 to be extended and retracted, as desired, relative to the headrail 12 and the second shade panel being supported between the intermediate rail 16 and the bottom rail 14 to allow the second shade panel 20 to be extended and retracted, as desired, between such rails 16, 14. The shade panels 18, 20 and related operating systems for extending/retracting the shade panels 18, 20 may generally be configured the same as or similar to any of the various embodiments described herein. However, unlike the embodiments described above, the second shade panel 20 shown in the embodiment of FIGS. 17-22 is configured as a "double-cell" cellular panel or blanket as opposed to the "single-cell" cellular panels or blankets shown in relation to the other embodiments described herein.

Figure 17A:
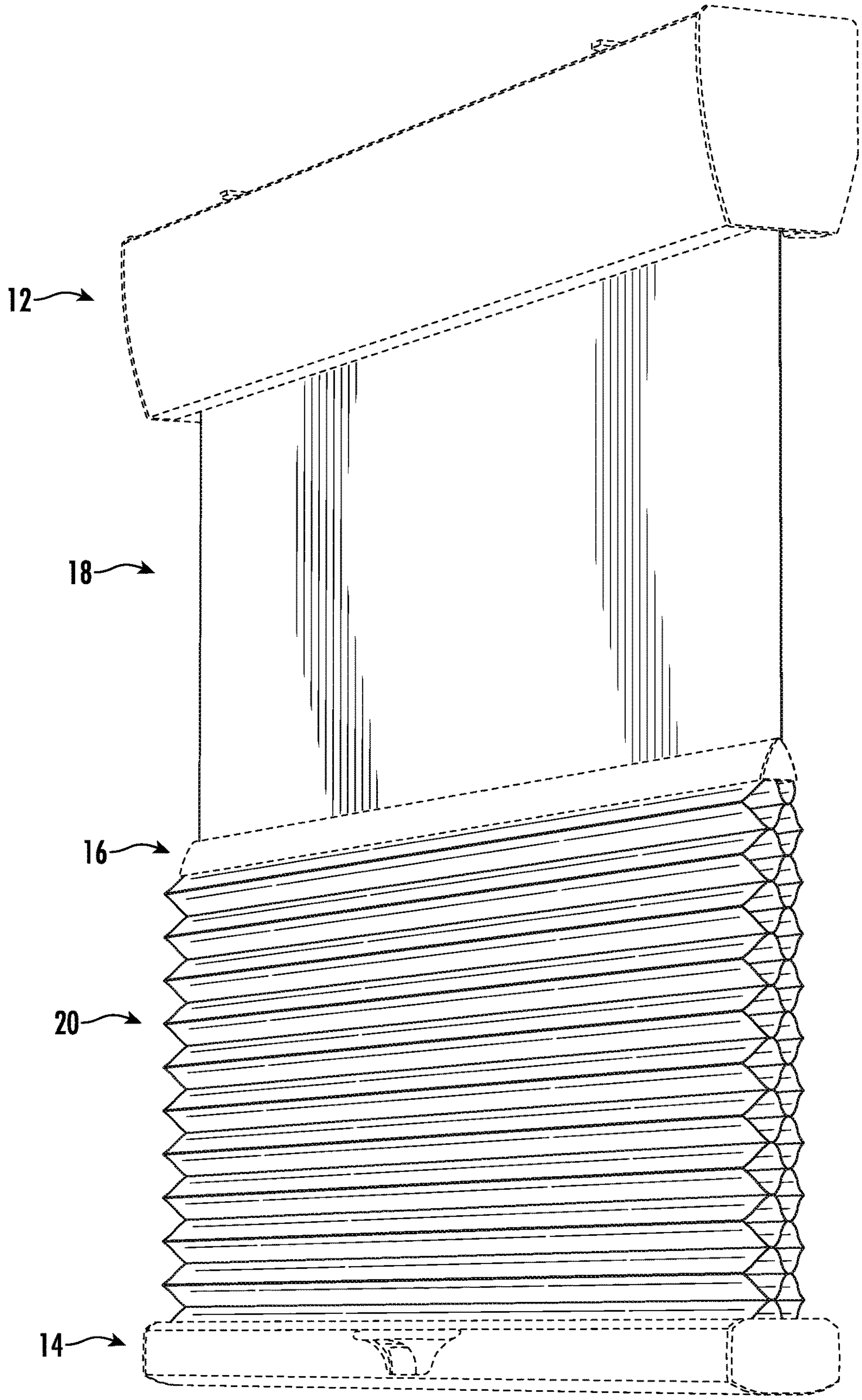
FIGS. 17A and 20A illustrate similar views of a hybrid covering for an architectural structure as that shown in FIGS. 17 and 20, respectively, with the hybrid covering shown in FIGS. 17A and 20A corresponding to an alternative embodiment of the hybrid covering shown in FIGS. 17 and 20.
Figure 18:
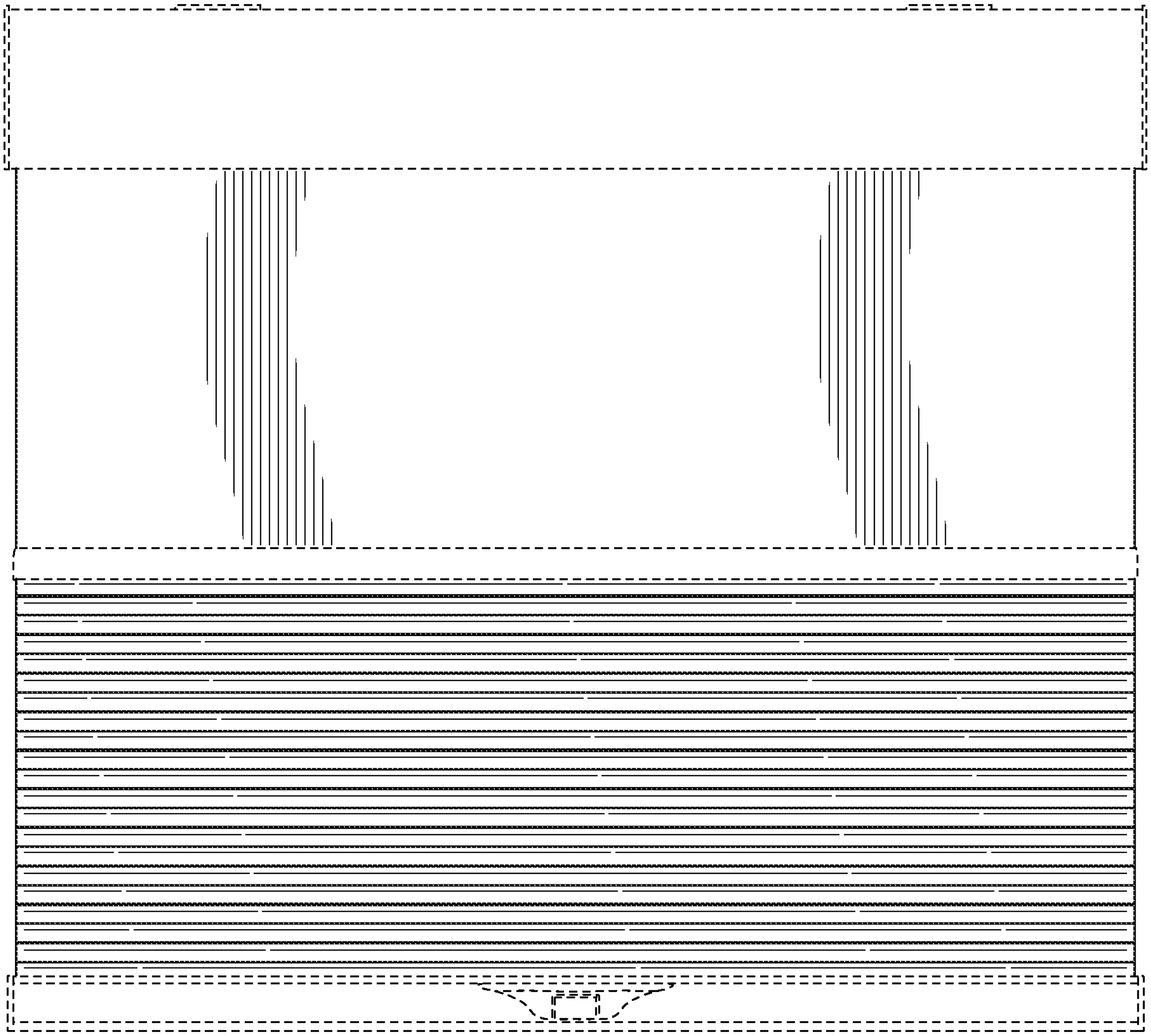
Figure 19:
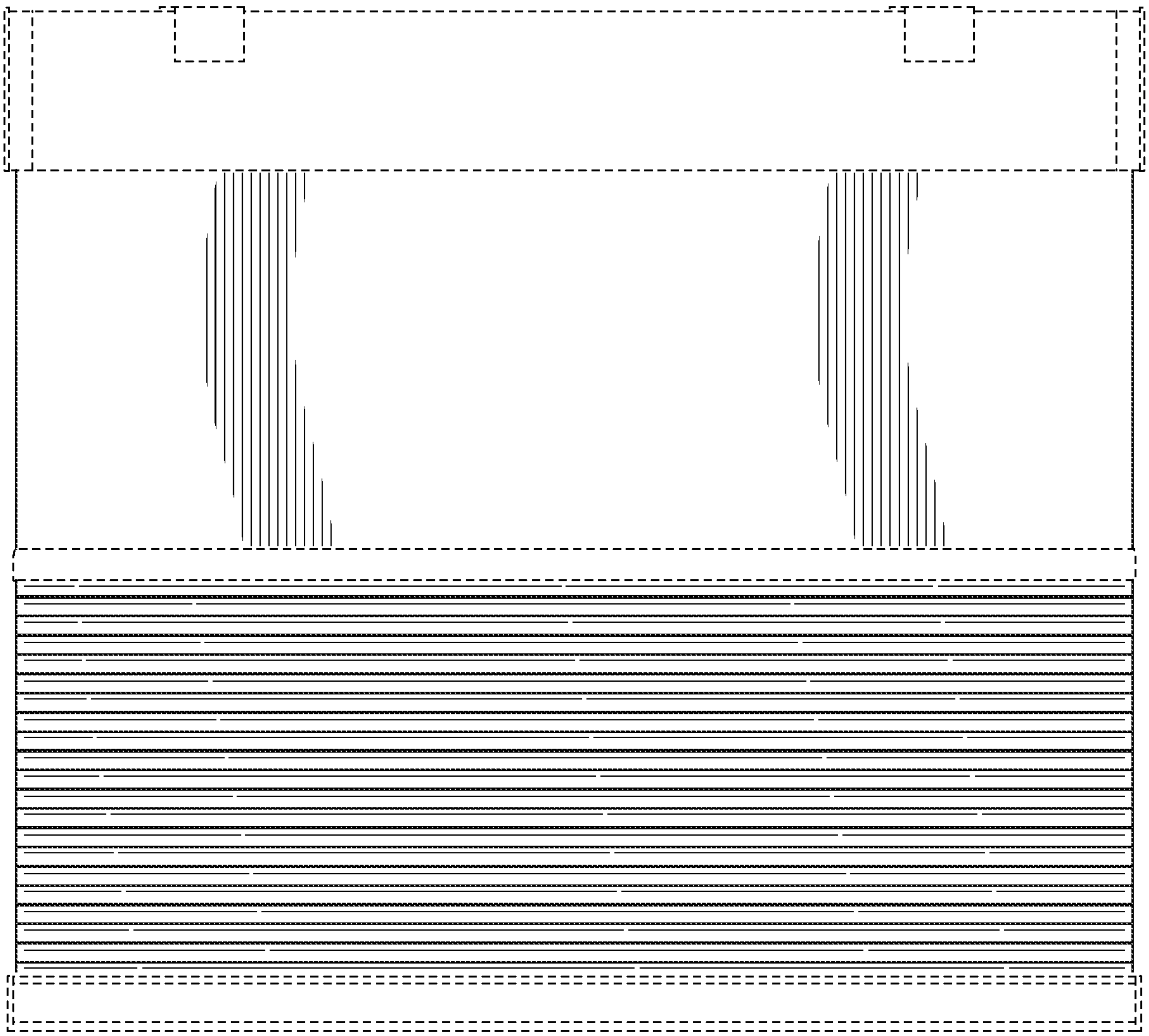
Figure 21:
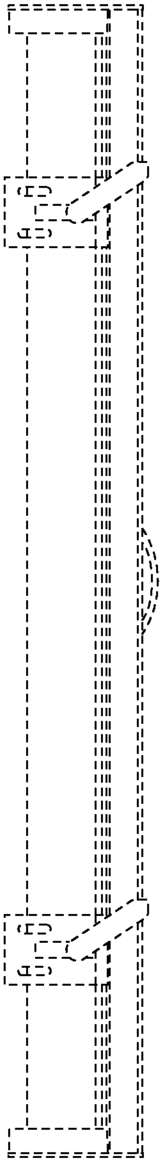
Figure 22:
Figure 20A:
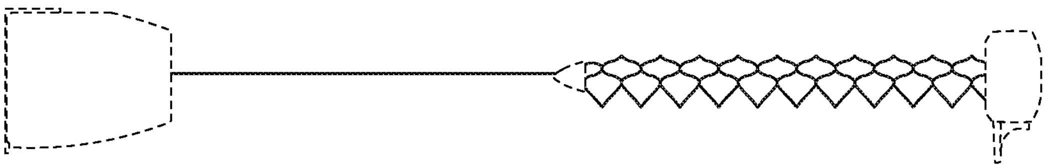
Figure 20:
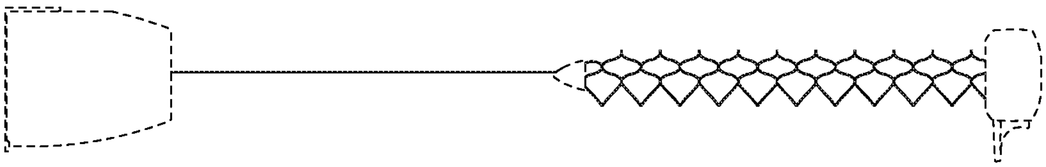

Additionally, it should be appreciated that FIGS. 17A and 20A illustrate views of an alternative embodiment of the hybrid covering 10 shown in FIGS. 17 and 20, respectively. Beyond the design distinctions shown in FIGS. 17A and 20A, the alternative hybrid covering is configured the same as that shown in FIGS. 17-22. In this regard, FIGS. 18, 19, 21, and 22 illustrate common features between the two hybrid coverings.

While the foregoing Detailed Description and drawings represent various embodiments, it will be understood that various additions, modifications, and substitutions may be made therein without departing from the spirit and scope of the present subject matter. Each example is provided by way of explanation without intent to limit the broad concepts of the present subject matter. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present subject matter covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present subject matter. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present subject matter being indicated by the appended claims, and not limited to the foregoing description.

In the foregoing Detailed Description, it will be appreciated that the phrases "at least one", "one or more", and "and/or", as used herein, are open-ended expressions that are both conjunctive and disjunctive in operation. The term "a" or "an" element, as used herein, refers to one or more of that element. As such, the terms "a" (or "an"), "one or more" and "at least one" can be used interchangeably herein. All directional references (e.g., proximal, distal, upper, lower, upward, downward, left, right, lateral, longitudinal, front, rear, top, bottom, above, below, vertical, horizontal, crosswise, radial, axial, clockwise, counterclockwise, and/or the like) are only used for identification purposes to aid the reader's understanding of the present subject matter, and/or serve to distinguish regions of the associated elements from one another, and do not limit the associated element, particularly as to the position, orientation, or use of the present subject matter. Connection references (e.g., attached, coupled, connected, joined, secured, mounted and/or the like) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

All apparatuses and methods disclosed herein are examples of apparatuses and/or methods implemented in accordance with one or more principles of the present subject matter. These examples are not the only way to implement these principles but are merely examples. Thus, references to elements or structures or features in the drawings must be appreciated as references to examples of embodiments of the present subject matter, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

What is claimed is:

1. A covering for an architectural structure, the covering comprising:

an upper rail;

a bottom rail configured to be spaced apart from the upper rail;

an intermediate rail positioned between the upper rail and the bottom rail;

a first shade panel supported between the upper rail and the intermediate rail and having a first shade configuration;

a second shade panel supported between the intermediate rail and the bottom rail and having a second shade configuration, the second shade configuration differing from the first shade configuration;

a first operating system provided in operative association with the upper rail and configured to allow the first shade panel to be extended and retracted as a spacing between the upper rail and the intermediate rail is increased and decreased, respectively, the first operating system requiring a first minimum operating force to be applied downwardly thereto to extend the first shade panel and increase the spacing between the upper rail and the intermediate rail; and a second operating system provided in one of the intermediate rail or the bottom rail and configured to allow the second shade panel to be extended and retracted as a spacing between the intermediate rail and the bottom rail is increased and decreased, respectively, the second operating system requiring a second minimum operating force to be applied downwardly thereto to extend the second shade panel and increase the spacing between the intermediate rail and the bottom rail, wherein the second minimum operating force is less than the first minimum operating force, and wherein the intermediate rail, the second shade panel, and the bottom rail are supported directly by the first shade panel without cords between the upper rail and the intermediate rail.

2. The covering of claim 1, wherein the second operating system is configured as an unbalanced operating system.

3. The covering of claim 2, wherein the second operating system includes a pair of lift cords extending between the intermediate and bottom rails, a lift rod, a pair of lift spools coupled for rotation with the lift rod, and a lock operatively coupled to the lift rod, wherein the lock is coupled to a user-actuatable component configured to allow the lock to be actuated between a locked position, at which the lock engages the lift rod so as to prevent rotation of the lift rod, and an unlocked position, at which the lock disengages the lift rod to allow rotation of the lift rod.

4. The covering of claim 1, wherein the second operating system comprises a balanced operating system.

5. The covering of claim 4, wherein the bottom rail is configured to be removably coupled to a portion of the architectural structure.

6. The covering of claim 1, wherein the differing first and second shade configurations correspond to at least one of different shade panel types for the first and second shade panels or different light transmissivity characteristics for the first and second shade panels.

7. The covering of claim 1, wherein the first operating system is independent and distinct from the second operating system.

8. The covering of claim 1, wherein the second operating system is provided in the bottom rail.

9. A covering for an architectural structure, the covering comprising:

an upper rail;

a bottom rail configured to be spaced apart from the upper rail;

an intermediate rail positioned between the upper rail and the bottom rail;

a first shade panel supported between the upper rail and the intermediate rail and having a first shade configuration;

a second shade panel supported between the intermediate rail and the bottom rail and having a second shade configuration, the second shade configuration differing from the first shade configuration;

a first operating system provided in operative association with the upper rail and configured to allow the first shade panel to be extended and retracted to increase and decrease, respectively, a spacing between the upper rail and the intermediate rail; and a second operating system provided in the bottom rail and configured to extend and retract the second shade panel to increase and decrease, respectively, a spacing between the intermediate rail and the bottom rail, wherein the intermediate rail is suspended without cords relative to the upper rail via the first shade panel, wherein the first operating system requires a first minimum operating force to be applied thereto to extend the first shade panel and increase the spacing between the upper rail and the intermediate rail, wherein the second operating system requires a second minimum operating force to be applied thereto to extend the second shade panel and increase the spacing between the intermediate rail and the bottom rail, and wherein the second minimum operating force is less than the first minimum operating force.

10. The covering of claim 9, wherein:

the first shade panel comprises a roller shade panel configured to be unwound from and wound around a roller as the roller shade panel is extended and retracted; and the roller is supported relative to or forms at least a portion of the upper rail.

11. The covering of claim 9, wherein the differing first and second shade configurations correspond to at least one of different shade panel types for the first and second shade panels or different light transmissivity characteristics for the first and second shade panels.

12. The covering of claim 9, wherein the second operating system is configured as an unbalanced operating system or a balanced operating system.

13. The covering of claim 9, wherein the bottom rail is configured to be removably coupled to a portion of the architectural structure.

14. The covering of claim 9, wherein at least one of the first operating system or the second operating system comprises a motorized operating system.

15. A covering for an architectural structure, the covering comprising:

a roller;

a bottom rail configured to be spaced apart from the roller;

an intermediate rail positioned between the roller and the bottom rail;

a roller shade panel supported between the roller and the intermediate rail;

a non-roller shade panel supported between the intermediate rail and the bottom rail;

a first operating system provided in operative association with the roller and configured to allow the roller shade panel to be unwound from and wound around the roller as the intermediate rail is respectively moved away from and towards the roller; and a second operating system provided in the bottom rail and configured to extend and retract the non-roller shade panel to increase and decrease, respectively, a spacing between the intermediate rail and the bottom rail, wherein the first operating system requires a first minimum operating force to be applied thereto to extend the roller shade panel, wherein the second operating system requires a second minimum operating force to be applied thereto to extend the non-roller shade panel and increase the spacing between the intermediate rail and the bottom rail, and wherein the second minimum operating force is less than the first minimum operating force.

16. The covering of claim 15, wherein the roller shade panel is formed from a sheer or transparent material and the non-roller shade panel is formed from a light-filtering or room-darkening material.

17. The covering of claim 15, wherein the non-roller shade panel comprises a cellular shade panel.

18. The covering of claim 15, wherein the second operating system comprises an unbalanced operating system or a balanced operating system.

19. The covering of claim 15, wherein the bottom rail is configured to be removably coupled to a portion of the architectural structure.

20. The covering of claim 15, wherein at least one of the first operating system or the second operating system comprises a motorized operating system.

* * * * *